United States Patent
Bhagath

(10) Patent No.: US 8,992,134 B2
(45) Date of Patent: Mar. 31, 2015

(54) CUTTING INSERT AND CUTTING TOOL

(71) Applicant: Tungaloy Corporation, Iwaki-shi, Fukushima (JP)

(72) Inventor: Kedar Suresh Bhagath, Iwaki (JP)

(73) Assignee: Tungaloy Corporation, Iwaki-shi, Fukushima (JP)

(*) Notice: Subject to any disclaimer, the term of this patent is extended or adjusted under 35 U.S.C. 154(b) by 259 days.

(21) Appl. No.: 13/758,885

(22) Filed: Feb. 4, 2013

(65) Prior Publication Data

US 2013/0149052 A1 Jun. 13, 2013

Related U.S. Application Data

(63) Continuation-in-part of application No. PCT/JP2012/066177, filed on Jun. 25, 2012.

(30) Foreign Application Priority Data

Jul. 4, 2011 (JP) ................................. 2011-148432

(51) Int. Cl.
*B23C 5/22* (2006.01)
*B23C 5/10* (2006.01)
(Continued)

(52) U.S. Cl.
CPC .............. *B23C 5/1027* (2013.01); *B23C 5/1045* (2013.01); *B23C 5/2221* (2013.01); *B23C 5/205* (2013.01); *B23C 5/207* (2013.01); *B23C 5/2256* (2013.01); *B23C 2200/362* (2013.01); *B23C 2210/0428* (2013.01); *B23C 2210/168* (2013.01)
USPC .............................................. 407/42; 407/65

(58) Field of Classification Search
USPC ................................... 407/42, 35, 61, 65, 113
See application file for complete search history.

(56) References Cited

U.S. PATENT DOCUMENTS

| | | | | |
|---|---|---|---|---|
| 4,834,591 A | * | 5/1989 | Tsujimura et al. | ............ 407/113 |
| 4,927,303 A | * | 5/1990 | Tsujimura et al. | ............ 408/223 |
| 5,017,055 A | * | 5/1991 | Tsujimura et al. | ............ 407/113 |

(Continued)

FOREIGN PATENT DOCUMENTS

| | | |
|---|---|---|
| JP | H10-71521 | 3/1998 |
| JP | 11-156625 A | 6/1999 |

(Continued)

OTHER PUBLICATIONS

International Preliminary Report on Patentability (IPRP) dated Jan. 7, 2014 issued in PCT counterpart application (No. PCT/JP2012/066177).

(Continued)

*Primary Examiner* — Will Fridie, Jr.
(74) *Attorney, Agent, or Firm* — Womble Carlyle

(57) ABSTRACT

An upper surface of a cutting insert includes a first rake face and a second seating surface. A lower surface of the cutting insert includes a second rake face and a first seating surface. The cutting edge includes a first cutting edge portion formed at a crossing edge line portion between the first rake face and a flank face and a second cutting edge portion formed at a crossing edge line portion between the second rake face and the flank face. The first cutting edge portion and the crossing edge line portion between the first seating surface and the flank face are positioned opposite each other. The second cutting edge portion and the crossing edge line portion between the second seating surface and the flank face are positioned opposite each other.

19 Claims, 19 Drawing Sheets

(51) Int. Cl.
B23C 5/20 (2006.01)
B23C 5/14 (2006.01)

(56) References Cited

U.S. PATENT DOCUMENTS

| | | | | |
|---|---|---|---|---|
| 5,221,162 | A | * | 6/1993 | Okawa ............................ 407/40 |
| 5,294,219 | A | * | 3/1994 | Shiratori et al. ................ 407/34 |
| 6,024,519 | A | * | 2/2000 | Okui et al. ..................... 407/113 |
| 6,149,355 | A | * | 11/2000 | Fouquer et al. ............... 407/113 |
| 2011/0243672 | A1 | * | 10/2011 | Kim ................................ 407/42 |

FOREIGN PATENT DOCUMENTS

| JP | 2000-210809 | | 8/2000 |
|---|---|---|---|
| JP | 2001-315021 | A | 11/2001 |

OTHER PUBLICATIONS

International Search Report and Written Opinion dated Sep. 25, 2012 issued in PCT counterpart application (No. PCT/JP2012/066177).

* cited by examiner

CUTTING INSERT AND CUTTING TOOL

CROSS-REFERENCE TO RELATED APPLICATIONS

This application is a continuation-in-part of PCT application No. PCT/JP2012/066177, filed Jun. 25, 2012, which claims the benefit of Japanese Patent Application No. 2011-148432, filed Jul. 4, 2011. The contents of the aforementioned applications are incorporated by reference in their entirety.

BACKGROUND OF THE INVENTION

1. Field of the Invention

The present invention relates to a cutting insert removably installed in a cutting edge-replaceable cutting tool main body and a cutting tool in which the cutting insert can be removably installed.

2. Description of the Related Art

For example, Japanese Patent Laid-Open No. 2000-210809 discloses a cutting insert and a cutting tool which are conventionally known. That is, the cutting insert includes a rake face formed on an upper surface thereof, flank faces formed on side surfaces thereof, and a cutting edge formed at a crossing edge line between the rake face and the flank face. The cutting insert is externally shaped substantially like a sectorial plate and includes one cutting edge portion shaped substantially like a quarter circular arc. Furthermore, one rake face is formed only on the upper surface, and a seating surface is formed on the lower surface. The cutting insert also includes one mounting hole formed therein. In this form, only one cutting edge portion shaped substantially like a quarter circular arc is formed in the cutting insert. That is, once the cutting edge portion becomes unusable, the cutting insert is unusable.

Only one side of such a cutting insert is used, and the shape of the seating surface, formed on the lower surface, is not particularly limited. Thus, the seating surface can be formed adjacent to a ridge portion of the lower surface which lies opposite the cutting edge portion shaped substantially like a quarter circular arc. That is, between the upper and lower surfaces of the plate, the cutting edge portion shaped substantially like a quarter circular arc and the crossing edge line between the seating surface and the flank face formed on the side surface of the plate are positioned opposite each other. Thus, the seating surface is estimated to be formed as a plane spanning the entire lower surface. Furthermore, Japanese Patent Laid-Open No. 2000-210809 discloses a cutting edge-replaceable ball endmill as a cutting tool in which the cutting insert is removably installed.

For example, Japanese Patent Laid-Open No. H10-71521 (1998) discloses other examples of a conventional cutting insert and a conventional cutting tool. The cutting insert is shaped like a plate and includes a rake face formed on an upper surface thereof, a flank face formed on a side surface thereof, and a cutting edge formed at a crossing edge line between the rake face and the flank face. The cutting insert includes two cutting edge portions each shaped substantially like a circular arc. The rake face is formed only on the upper surface, and one mounting hole is formed in the cutting insert. The two cutting edge portions each shaped substantially like a circular arc are formed to be different from each other in length. Also in Japanese Patent Laid-Open No. H10-71521 (1998), the cutting edge portion is formed only on one side of the cutting insert. Thus, only this side of the cutting insert is used. Hence, a planar seating surface is formed all over the lower surface with no cutting edge portion formed thereon. That is, between the upper and lower surfaces of the plate, each of the two cutting edge portions each shaped substantially like a circular arc and a corresponding one of the two crossing edge lines each between the seating surface and the flank face formed on the side surface of the plate are positioned opposite each other. Furthermore, the profile of the cutting insert in an embodiment can have two acute vertices when at least one of the cutting edge portions each shaped substantially like a circular arc is set smaller than the quarter circular arc in length. Additionally, Japanese Patent Laid-Open No. H10-71521 (1998) discloses a cutting edge-replaceable ball endmill as a cutting tool in which the cutting insert is removably installed.

According to the cutting insert in Japanese Patent Laid-Open No. 2000-210809, only one cutting edge is formed in one cutting insert. That is, each cutting insert can be used only once. This disadvantageously increases manufacturing costs per cutting edge.

On the other hand, according to the cutting insert in Japanese Patent Laid-Open No. H10-71521 (1998), two cutting edges are formed in one cutting insert. Thus, one cutting insert can be used twice, reducing the manufacturing costs per cutting edge. However, if the cutting insert is used in a cutting edge-replaceable ball endmill, the cutting insert with the single shape may be used as two types of cutting edges; the cutting insert may use a cutting edge with a central edge passing through a rotation center and a cutting edge including no central edge and starting at a position away from the rotation center. For an insert seat of the tool main body to which a cutting insert including a cutting edge with a rotationally central edge is attached, the following operation is required to provide an insert seat wall surface with a sufficient thickness to resist a cutting force exerted during cutting: another cutting edge with no central edge is attached to the tool main body substantially away from the rotation center.

Given that in the cutting insert in Japanese Patent Laid-Open No. H10-71521 (1998), the cutting edge with no central edge is placed close to the rotation center, two cutting edge portions each shaped substantially like a quarter circular arc need to be formed on the one upper surface. In this case, the profile of the cutting insert is difficult to provide with two acute vertices. Both of the two vertices are inevitably formed to have an obtuse angle that is about 90 degrees or greater than 90 degrees (see an angle $\alpha$ in FIG. 15). That is, if a cutting edge shaped substantially like a quarter circular arc is placed close to the rotation center, the sum of angles of two vertices of the cutting edge is 180°. Here, if one of the two cutting edges is assumed to have an acute angle $\alpha°$, the other cutting edge has an obtuse angle (180°-$\alpha°$). Furthermore, if a cutting edge shaped substantially like a one-third circular arc which is longer than the cutting edge shaped substantially like a quarter circular arc is placed close to the rotation center, the sum of angles of two vertices of the cutting edge is 240°. Here, if one of the two cutting edges is assumed to have an acute angle $\alpha°$, the other cutting edge has an obtuse angle (240°-$\alpha°$). That is, the cutting edge portion needs to be shorter than the quarter circular arc in order to set both of the two cutting edges to have acute angles. When a cutting edge with no central edge is thus placed close to the rotation center, vertices equal to or greater than about 90 degrees lie close to each other. In this case, a part of the wall surface of an insert seat of the tool main body which part is located near the rotation center is likely to have an insufficient thickness or cannot be provided. Thus, the cutting insert cannot be fully held and is easy to move. Hence, disadvantageously, the tool offers a sharply reduced stiffness.

Moreover, the wall surface of the insert seat of the tool main body in Japanese Patent Laid-Open No. H10-71521 (1998) is mainly formed of a circular-arc wall surface portion as seen from a direction opposite to a bottom surface of the insert seat, in order to support the profile of the cutting insert. Thus, the cutting insert is easy to move in the direction of rotation, disadvantageously reducing a clamp stiffness.

Furthermore, if a cutting edge with no central edge is attached to the tool main body away from the rotation center, only the cutting insert including a cutting edge with a rotationally central edge carries out machining at the end portion of the tool during cutting. Since the cutting edge with no central edge is located away from the rotation center, a larger area needs to be machined only by the cutting edge with the rotationally central edge. When a larger area needs to be machined only by the cutting edge with the rotationally central edge, the cutting edge with the rotationally central edge needs to bear an increased load. Thus, compared to the tool life of the cutting edge with no central edge, the cutting edge with a rotationally central edge has a shortened tool life. In other cases, in order to prevent the tool life from being shortened, the level of cutting conditions needs to be decreased, disadvantageously resulting in reduced efficiency.

Thus, an object of the present invention is to provide a cutting insert and a cutting tool which require only low manufacturing costs per cutting edge and which offer a very high tool stiffness, the cutting insert and cutting tool thus enabling efficient cutting.

SUMMARY OF THE INVENTION

The present invention thus provides a cutting insert formed like a plate and comprising a seating surface and a cutting edge formed thereon, the seating surface serving as an abutting surface when the cutting insert is attached to a tool main body, the cutting edge being formed at a crossing edge line portion between a rake face and a flank face provided on side surfaces of the plate, the cutting insert being characterized in that the plate includes an upper surface with a first rake face and a second seating surface formed thereon and a lower surface with a second rake face and a first seating surface formed thereon, in that the cutting edge comprises a substantially circular arc-shaped first cutting edge portion formed at a crossing edge line portion between the first rake face formed on the upper surface of the plate and the flank face formed on the side surface of the plate, and a substantially circular arc-shaped second cutting edge portion formed at a crossing edge line portion between the second rake face formed on the lower surface of the plate and the flank face formed on the side surface of the plate, and in that between the upper surface and lower surface of the plate, the substantially circular arc-shaped first cutting edge portion and a crossing edge line portion between the first seating surface and the flank face provided on the side surface of the plate are positioned opposite each other, and between the upper surface and lower surface of the plate, the substantially circular arc-shaped second cutting edge portion and a crossing edge line portion between the second seating surface and the flank face provided on the side surface of the plate are positioned opposite each other.

The cutting tool is a rotary cutting tool in which the cutting insert described above is removably installed.

Thus, the present invention as described above can provide a cutting insert and a cutting tool which require only low manufacturing costs per cutting edge and which offer a very high tool stiffness, the cutting insert and cutting tool thus enabling efficient cutting.

Further features of the present invention will become apparent from the following description of exemplary embodiments (with reference to the attached drawings).

DETAILED DESCRIPTION

Embodiments of the present invention will be described below with reference to the drawings.

Figure 1:
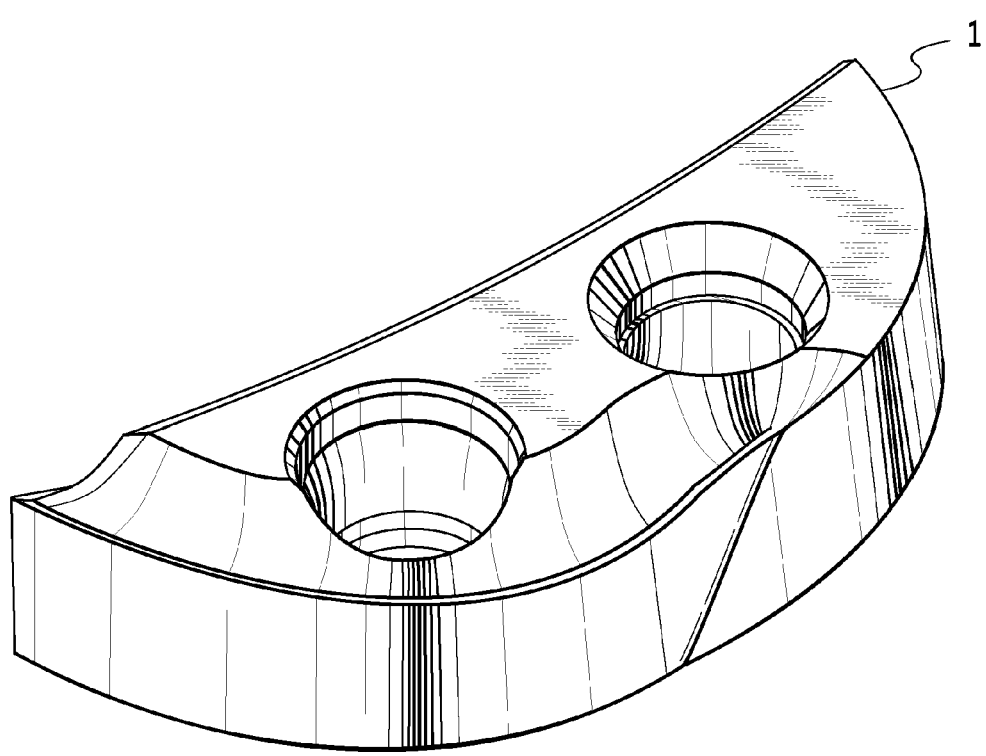
FIG. 1 is a perspective view of an embodiment of a cutting insert.
Figure 2:
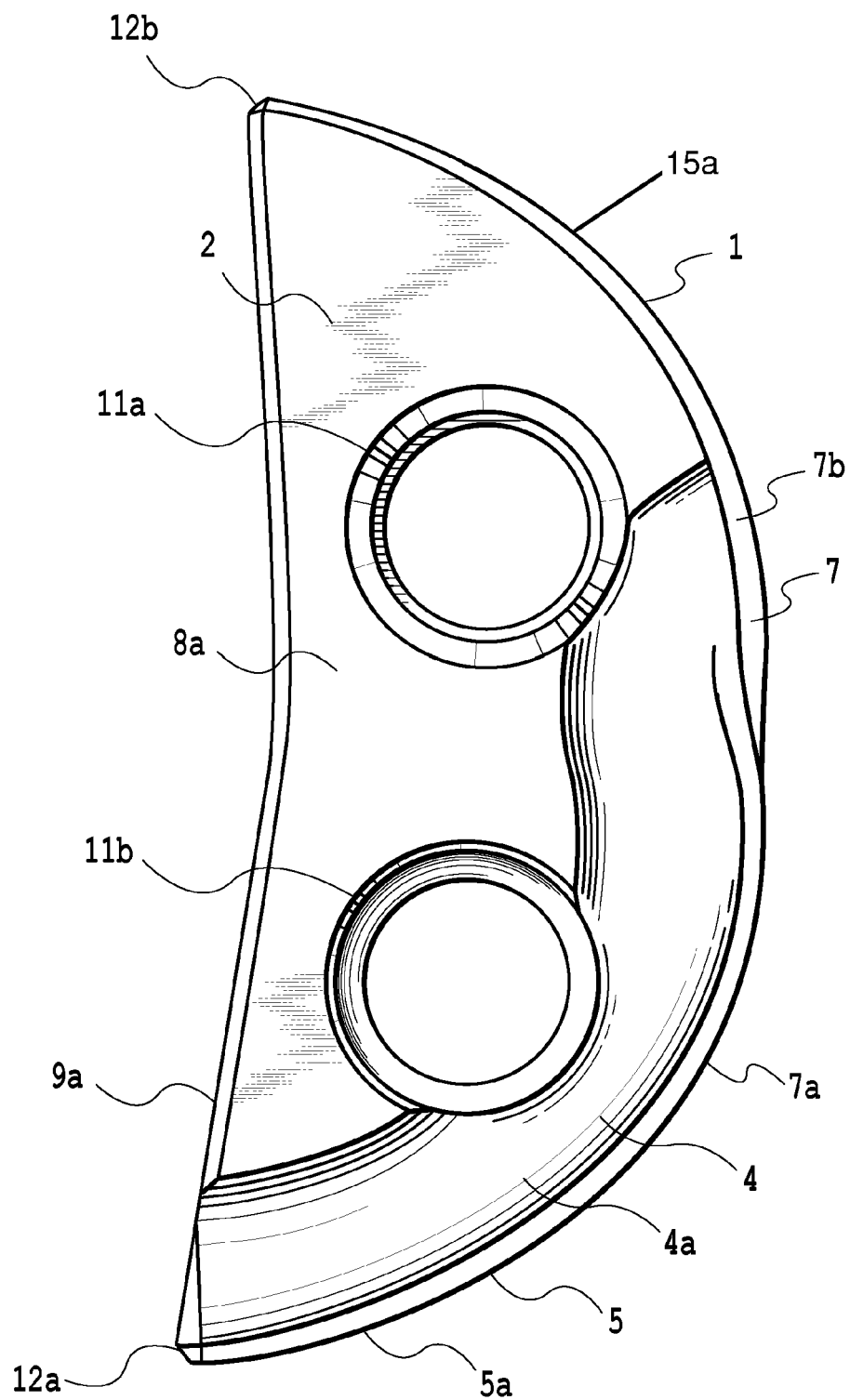
FIG. 2 is a plan view of the cutting insert in FIG. 1.
Figure 3:
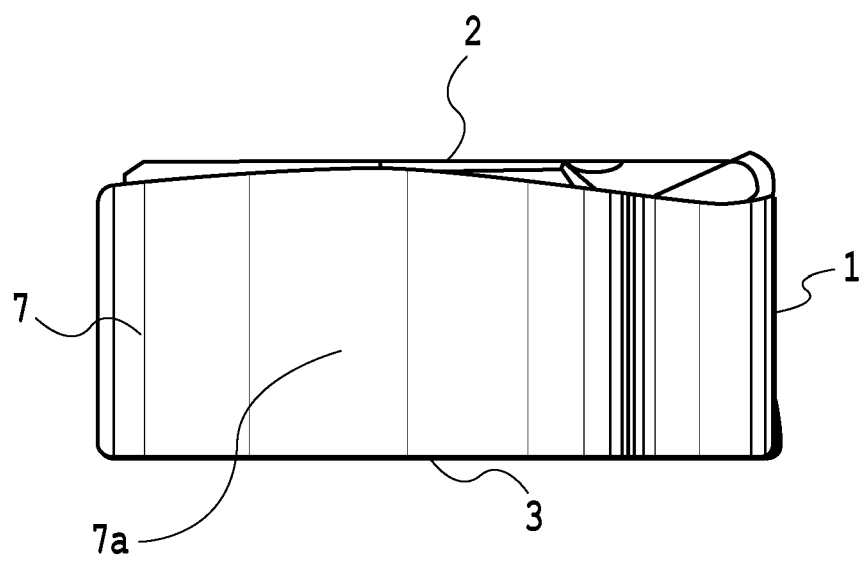
FIG. 3 is a front view of the cutting insert in FIG. 2.
Figure 6:
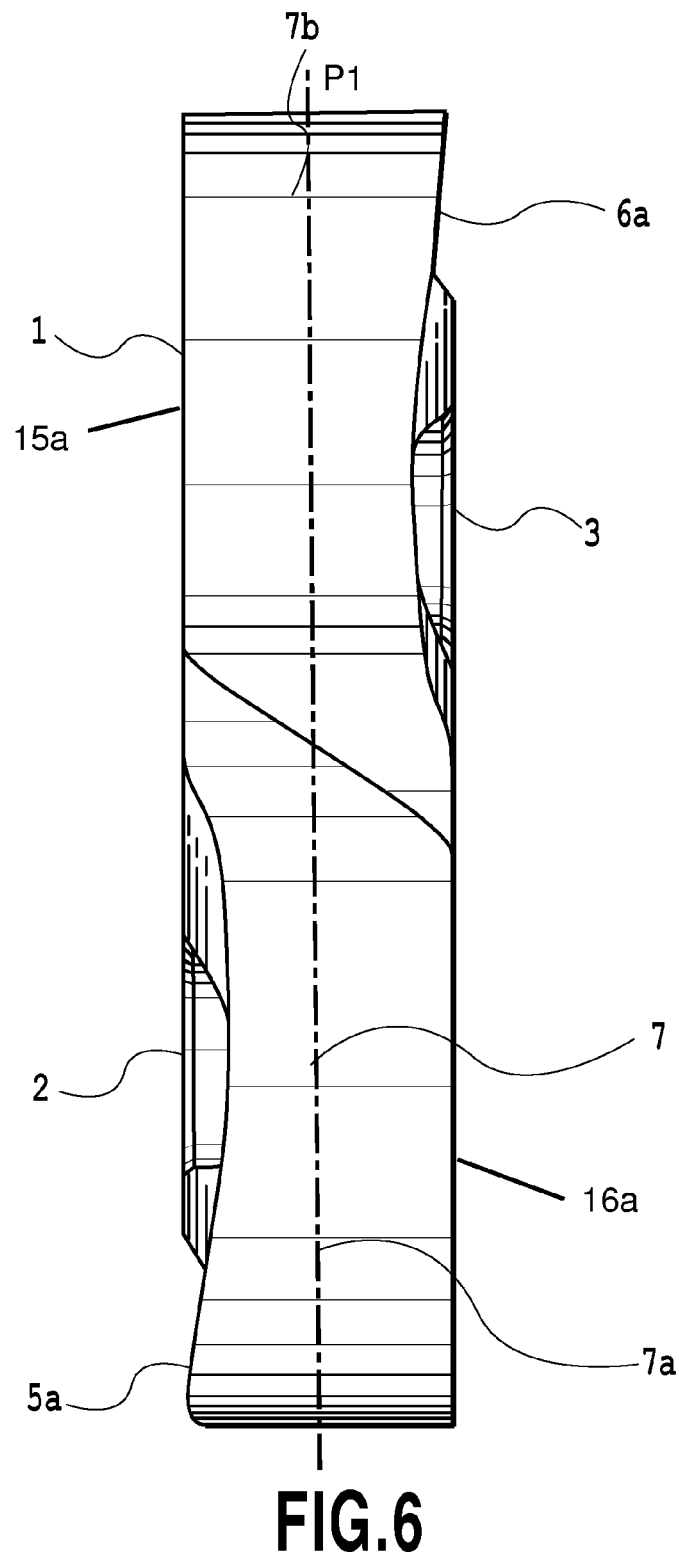
FIG. 6 is a right side view of the cutting insert in FIG. 2.
Figure 7:
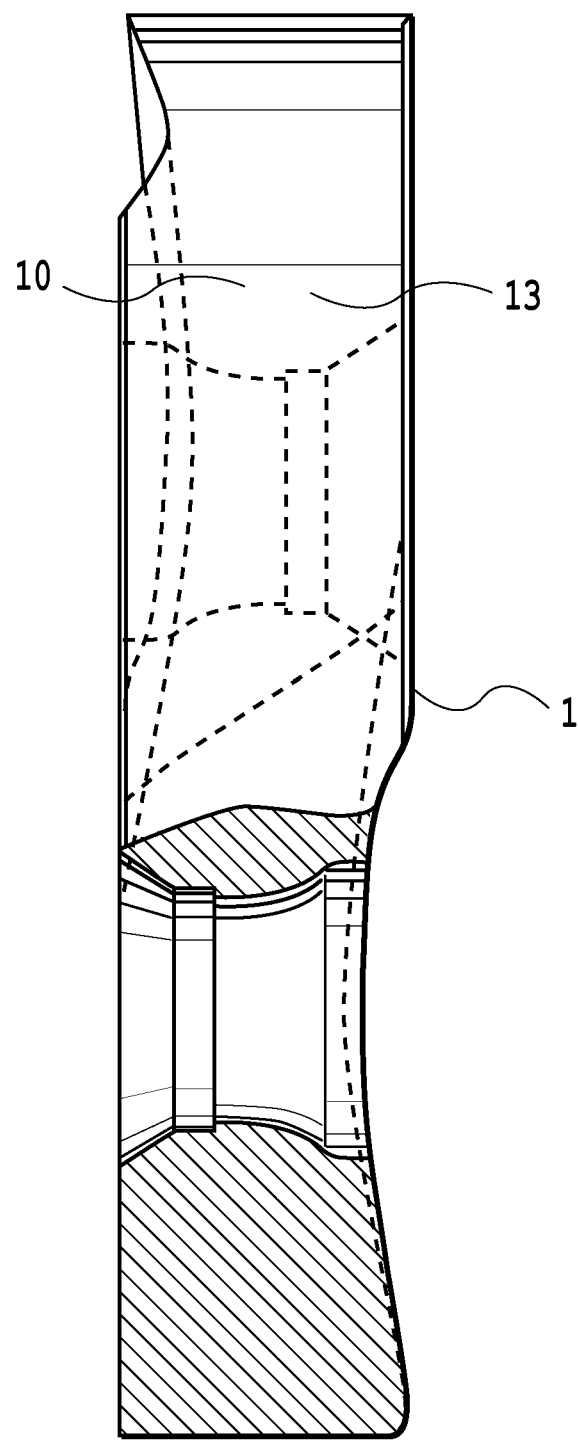
FIG. 7 is a left side view of the cutting insert in FIG. 2.
Figure 8:
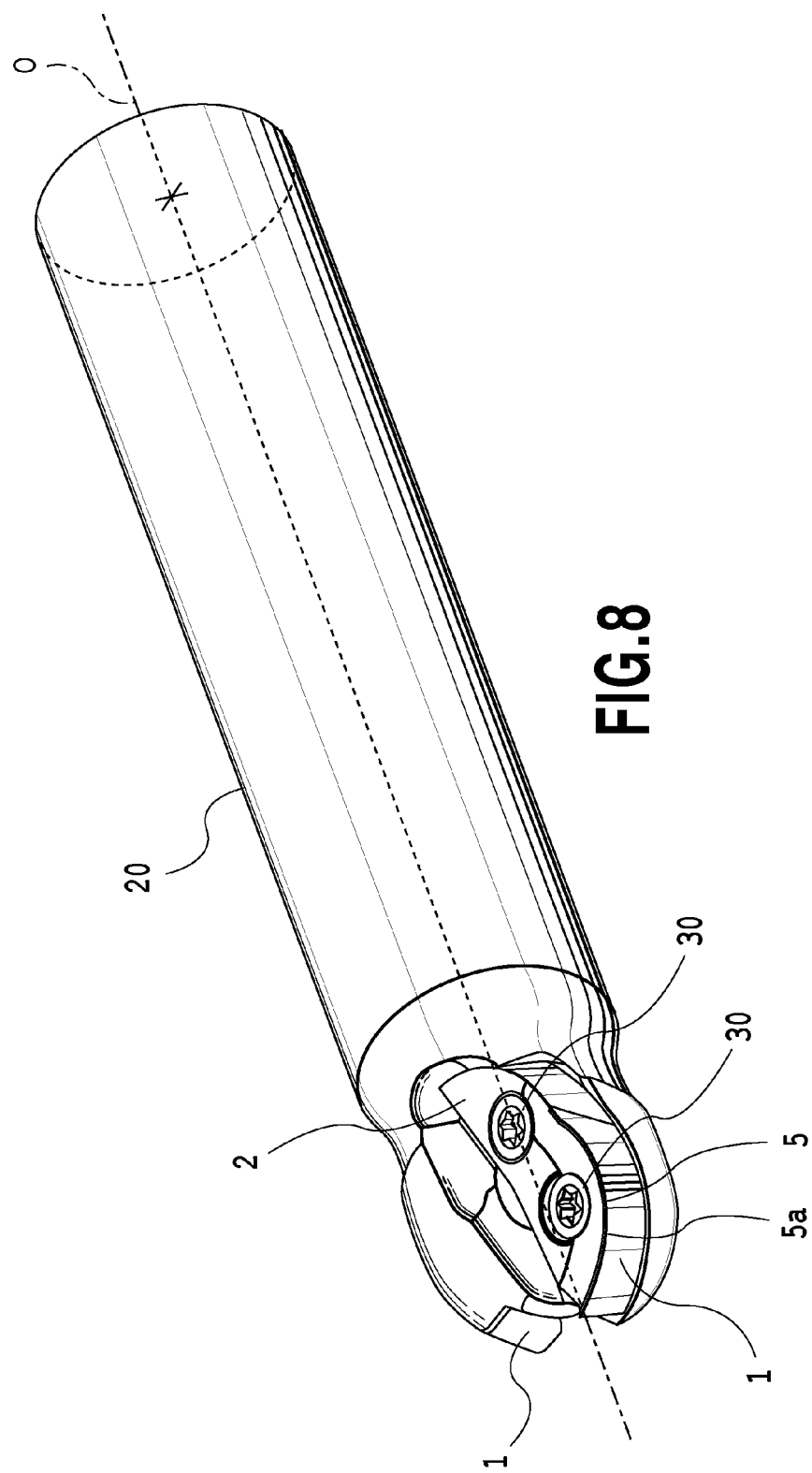
FIG. 8 is a perspective view of an embodiment of a rotary cutting tool with a cutting insert installed therein.
Figure 13:
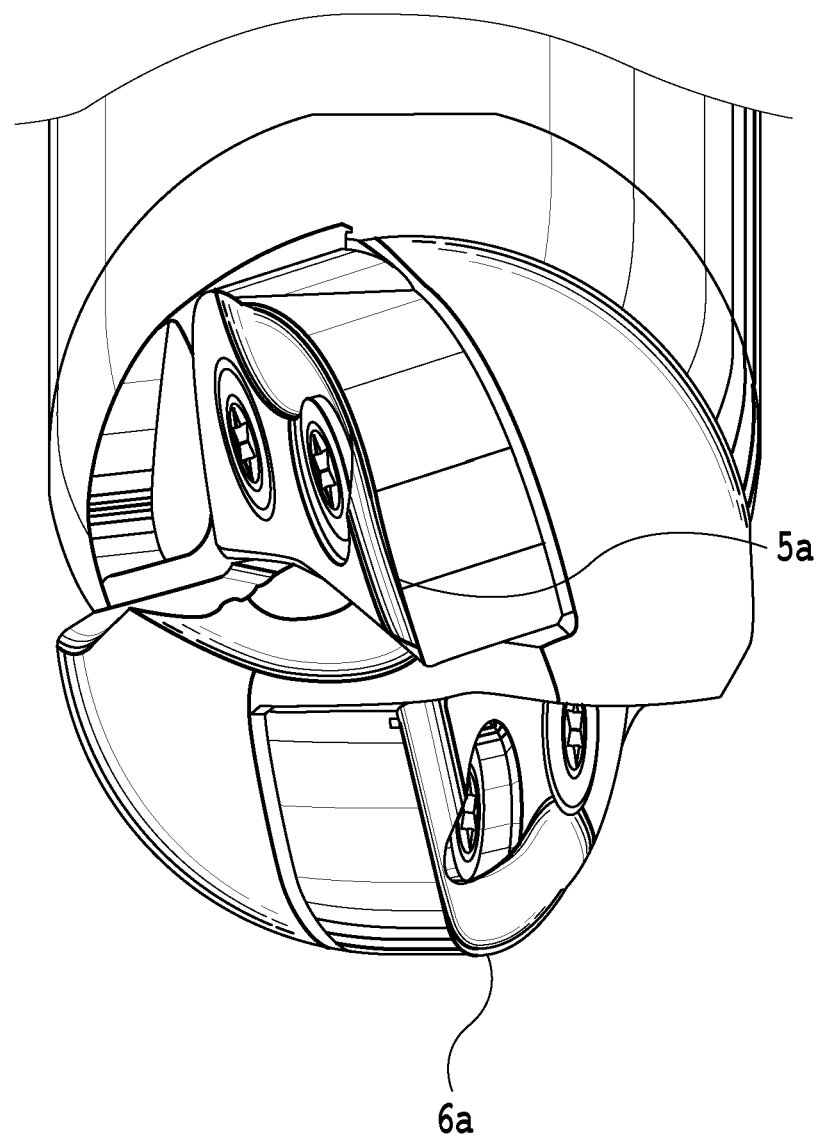
FIG. 13 is an enlarged perspective view of the rotary cutting tool in FIG. 8 as seen from a different direction.
Figure 14:
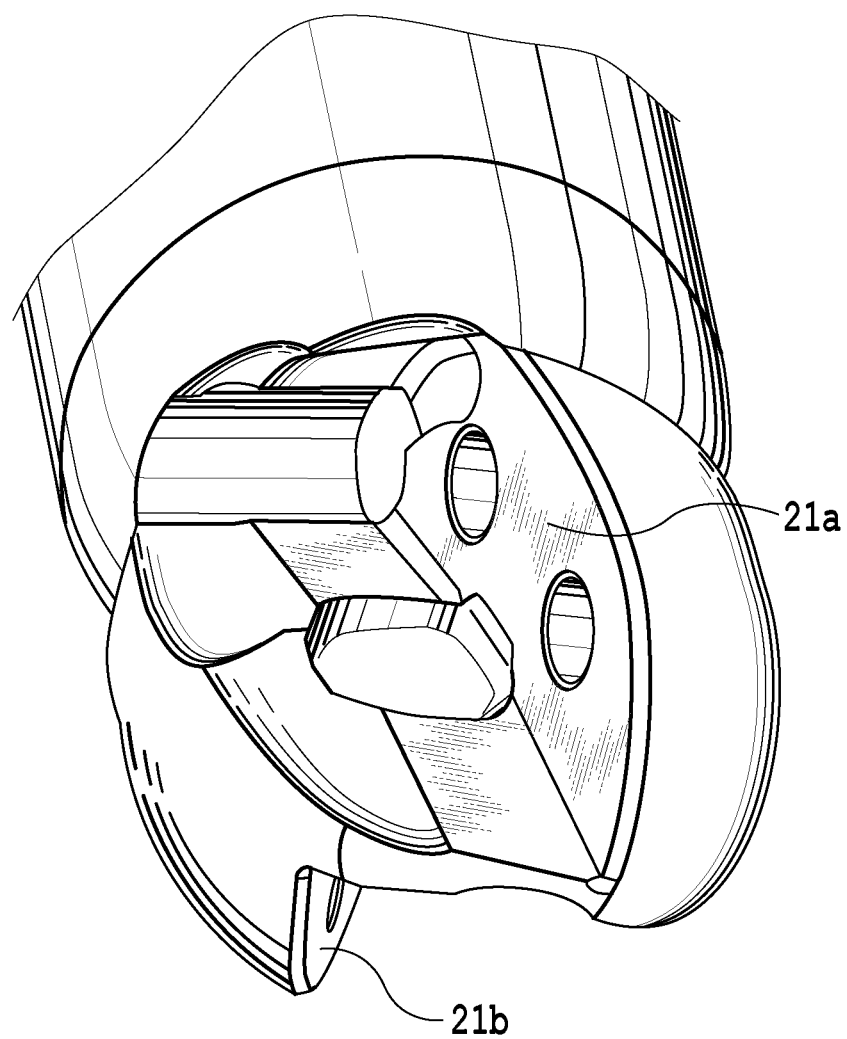
FIG. 14 is an enlarged perspective view of the rotary cutting tool in FIG. 8 with no cutting insert installed therein, as seen from a different direction.
Figure 15:
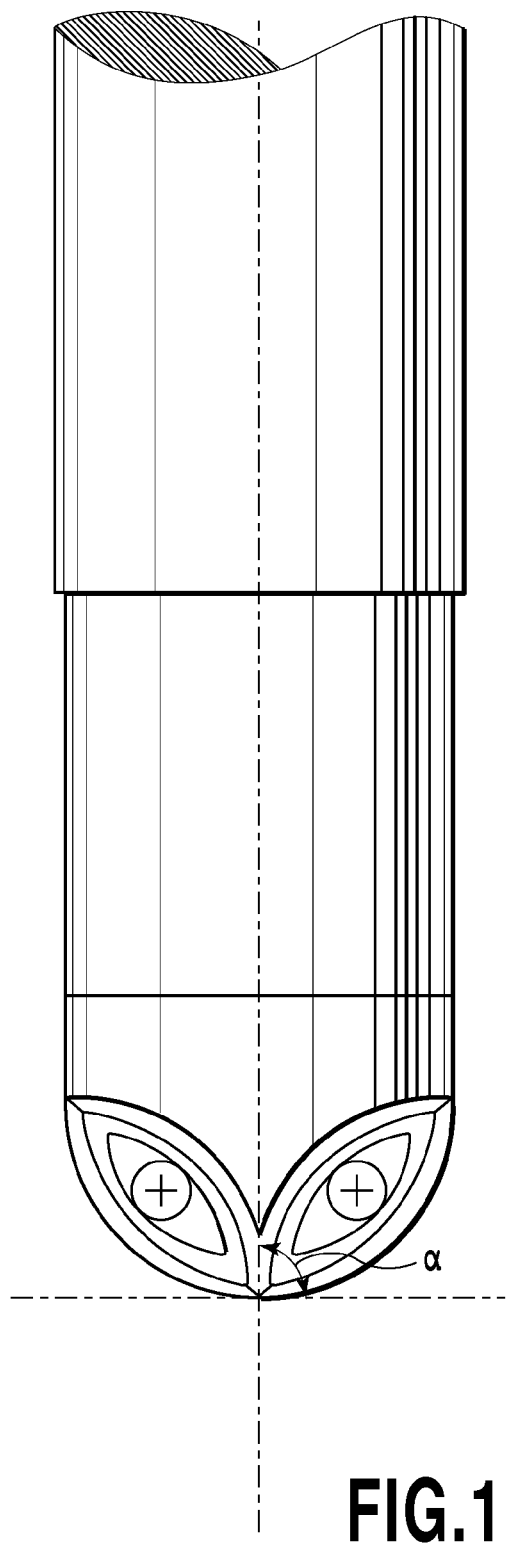
FIG. 15 is a diagram showing a conventional insert.

FIG. 1 is a perspective view of an embodiment of a cutting insert. FIG. 2 is a plan view of the cutting insert in FIG. 1. Furthermore, FIG. 3 to FIG. 7 are a front view (FIG. 3), a bottom view (FIG. 4), a rear view (FIG. 5), a right side view (FIG. 6), and a left side view (FIG. 7) of the cutting insert in FIG. 2. FIG. 7 shows the shape of a mounting hole and the like by dashed lines and partly shows the cutting insert in section. Additionally, FIG. 8 is a perspective view of an embodiment of a rotary cutting tool with a cutting tool installed therein. FIG. 9 to FIG. 12 are a front view (FIG. 9), a bottom view (FIG. 10), a right side view (FIG. 11), and a left side view (FIG. 12) of the rotary cutting tool in FIG. 8. FIG. 13 is an enlarged perspective view of the rotary cutting tool in FIG. 8 as seen from a different direction. In addition, FIG. 14 is an enlarged perspective view of the rotary cutting tool in FIG. 8 with no cutting insert installed therein, as seen from a different direction.

As shown in FIG. 1 to FIG. 7, a cutting insert 1 according to the present embodiment appears substantially like a crescent moon as seen from an upper surface 2 or a lower surface 3 of the cutting insert 1. That is, the cutting insert 1 appears to include a substantially half circular arc-shaped ridge as seen from the upper surface 2 or the lower surface 3. Another ridge is shaped to be recessed toward the inside of the cutting insert 1. The substantial crescent-moon shape may be shorter than a half circular arc. The substantial crescent-moon shape may be longer than a half circular arc. Such a shape is hereinafter referred to as a substantial crescent-moon shape.

The ridge recessed toward the inside of the cutting insert 1 may be shaped like a circular arc with a larger radius of curvature than the another substantially half circular arc-shaped ridge or may be shaped like a combination of circular arcs and straight lines. In the present embodiment, a cutting insert with a substantial V shape formed mainly of two straight lines combined with a circular arc will be described by way of example.

The profile of the cutting insert 1 according to the present embodiment will be described in further detail. The substantially half circular arc-shaped ridge is shaped like two substantially quarter circular arc-shaped ridges connected together. The connection portion between the two substantially quarter circular arc-shaped ridges is smooth as a result of the ridge slightly recessed toward the inside of the cutting insert 1 (see FIG. 2). A straight line portion and the like may be formed in the connection portion. In the present embodiment, the cutting insert 1 is externally shaped substantially like a crescent moon but is not limited to this profile. For example, the cutting insert 1 may have another shape with a substantially circular arc-shaped ridge typified by, for example, a substantial half moon or a substantial sector form. The substantial half moon as used herein refers to a shape in which the ridge otherwise recessed inward in the substantially crescent moon-shaped cutting insert 1 according to the present embodiment is not recessed but is shaped substantially like a straight line. Furthermore, the substantial sector form as used herein refers to a shape in which the ridge otherwise recessed inward in the substantially crescent moon-shaped cutting insert 1 according to the present embodiment bulges toward the outside of the cutting insert 1. The outward bulge may be shaped like a circular arc or a combination of a circular arc and a straight line. For example, the recessed ridge effectively serves to increase the stiffness of the tool main body 20 of a cutting edge-replaceable rotary cutting tool in which the cutting insert 1 is installed. Additionally, the bulging ridge like a substantial sector form effectively restrains the cutting insert 1 from being chipped off. In addition, the ridge formed substantially like a straight line as in the case of the substantial half-moon shape, for example, effectively allows two substantially quarter circular arc-shaped ridges to be formed to be the same in length. Thus, the different shapes serve to offer the respective characteristics.

The shape and length of the substantially circular arc-shaped ridge are not limited to those of a half circular arc. The shape and length of the substantially circular arc-shaped ridge are preferably equal to or greater than those of a one-eighth circular arc and equal to or smaller than those of a five-eighths circular arc. In particular, when the cutting insert is used for a cutting tool with a ball nose, the shape and length preferably exceed those of a quarter circular arc and are equal to or smaller than those of a half circular arc. The dimensional range of such a shape makes the cutting insert 1 particularly suitable for increasing the tool stiffness.

A rake face 4 is formed on a part of the upper surface 2 and lower surface 3 of the cutting insert 1. Here, the rake face 4 formed on the upper surface 2 is referred to as a first rake face 4a. The rake face 4 formed on the lower surface 3 is referred to as a second rake face 4b. The rake face 4 is a generic term for the first rake face 4a and the second rake face 4b. The rake face 4 is formed as a part of a chip breaker. Various known techniques can be applied to the shape of the chip breaker.

A cutting edge 5 is formed at a ridge including a substantially circular arc-shaped ridge formed at the crossing edge line between the rake face 4a formed on the upper surface 2 and a flank face 7 formed on a part of a side surface 13 which corresponds to the rake face 4a (see FIG. 2). Furthermore, a cutting edge 6 is formed at a ridge including a substantially circular arc-shaped ridge formed at the crossing edge line between the rake face 4b formed on the lower surface 3 and a flank face 7 formed on a part of the side surface 13 which corresponds to the rake face 4b (see FIG. 4). The substantially circular arc-shaped cutting edge portion formed at the cutting edge 5 is referred to as a substantially circular arc-shaped first cutting edge portion 5a, or simply as "first cutting edge portion 5a". The substantially circular arc-shaped cutting edge portion formed at the cutting edge 6 is referred to as a substantially circular arc-shaped second cutting edge portion 6a, or simply as "second cutting edge portion 6a". In the present embodiment, the radius of curvature of the substantial circular arc is about R=15.9 mm for both the cutting edges 5 and 6. The radius of curvature of the substantial circular arc can be optionally set depending on the desired resultant shape and the angle at which the cutting insert is attached to the tool main body.

Figure 11:
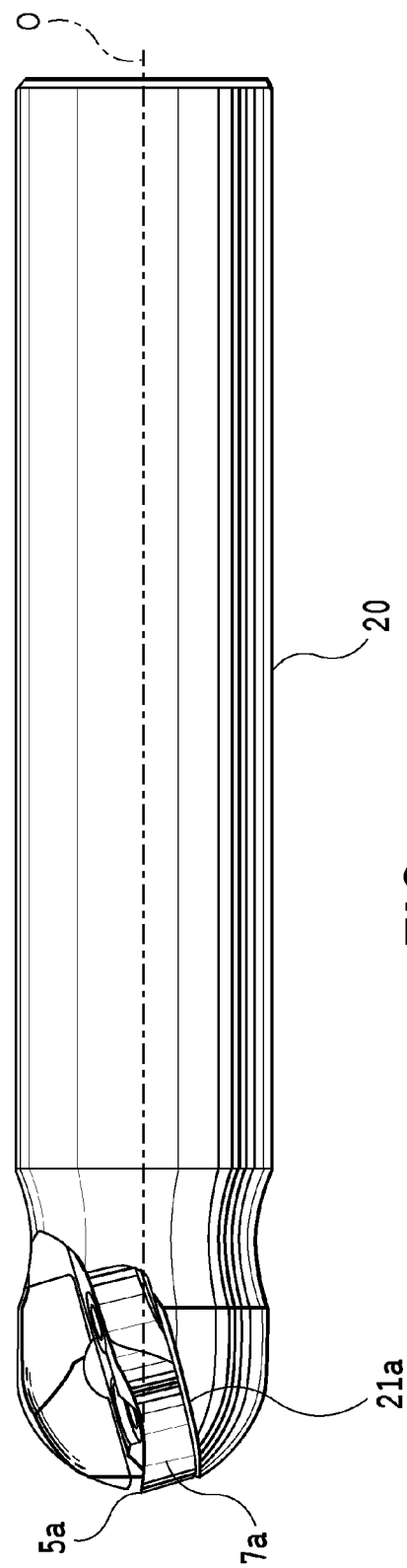
FIG. 11 is a right side view of the rotary cutting tool in FIG. 8.
Figure 12:
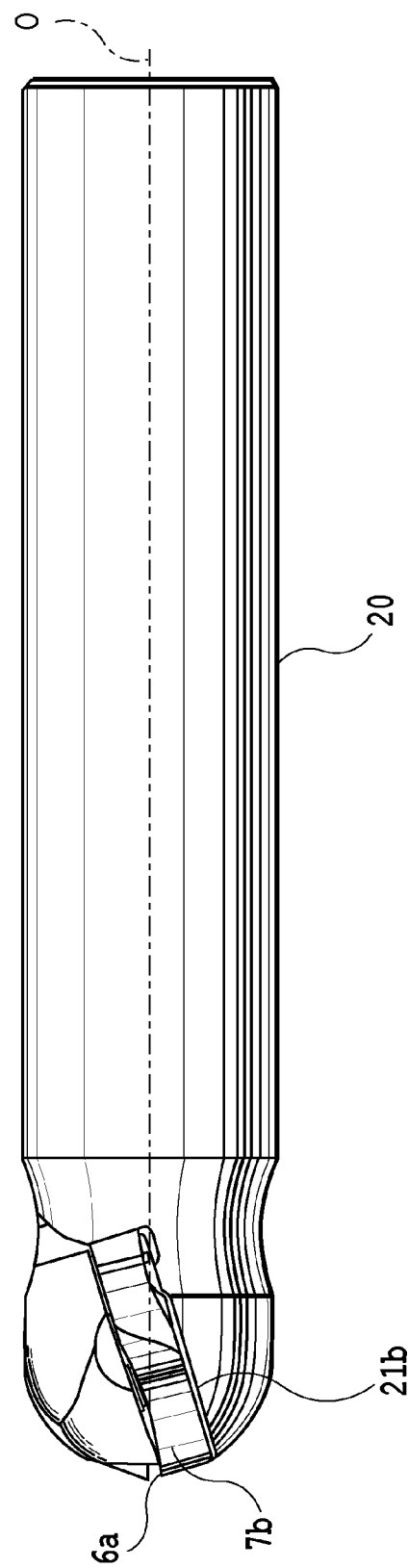
FIG. 12 is a left side view of the rotary cutting tool in FIG. 8.

As shown in FIG. 11, the cutting insert 1 is attached obliquely to a tool main body 20. To be exact, the substantially circular arc-shaped first cutting edge portion 5a and the substantially circular arc-shaped second cutting edge portion 6a are not shaped like a circular arc, and the profile of the cutting insert 1 is similar to an ellipse so that when the tool main body 20 with the cutting insert 1 attached obliquely thereto is rotated for machining, a rotational trajectory of the tip portion of the cutting insert 1 forms a substantial spherical surface.

As shown in FIG. 8, when the cutting inserts 1 are inserted in the tool main body 20 of a cutting edge-replaceable rotary cutting tool (ball endmill), the first cutting edge portion (the cutting edge with a rotationally central edge in the mounted tool) 5a is placed up to the vicinity of the rotation center of the tool, that is, up to the vicinity of a tool rotation axis O, so as to serve as the cutting edge 5 with a rotationally central edge. Furthermore, for the operative second cutting edge portion 6a, the cutting edge 6 starts at a position further away from the tool rotation center than for the operative first cutting edge portion 5a. The operative second cutting edge portion 6a thus serves as the cutting edge 6 with no rotationally central edge. That is, the second cutting edge portion 6a has an actually effective cutting edge length slightly shorter than that of the first cutting edge portion 5a. That is, the first cutting edge portion 5a and the second cutting edge portion 6a are formed to be slightly different from each other in length. The first cutting edge portion 5a and the second cutting edge portion 6a are not limited to the above-described configuration but may be the same in length or may be shaped like circular arcs with different radii. As described above, even if the rotational trajectories of the cutting edges have the same radius of curvature when the cutting inserts 1 are installed in the cutting tool, the radius of curvature of each of the cutting edges of each cutting insert 1 can be optionally adjusted depending on the angle at which the cutting edge is installed in the cutting tool.

The first cutting edge portion 5a and the second cutting edge portion 6a each include a connection portion for the circular arcs. The cutting edge formed by joining the circular arc-shaped cutting edge potions together appears like a substantially S-shaped curve as seen from a side surface side as shown in FIG. 6. That is, for example, the first cutting edge portion 5a first approaches the lower surface in a curve that inclines smoothly so as to be recessed with respect to the upper surface, then extends away from the lower surface, and extends, in a curve, toward the upper surface and the cutting edge located parallel to the lower surface of the connection portion. This allows the cutting edges to be smoothly connected together. Thus, during cutting, chips flow smoothly, reducing cutting resistance.

Figure 4:
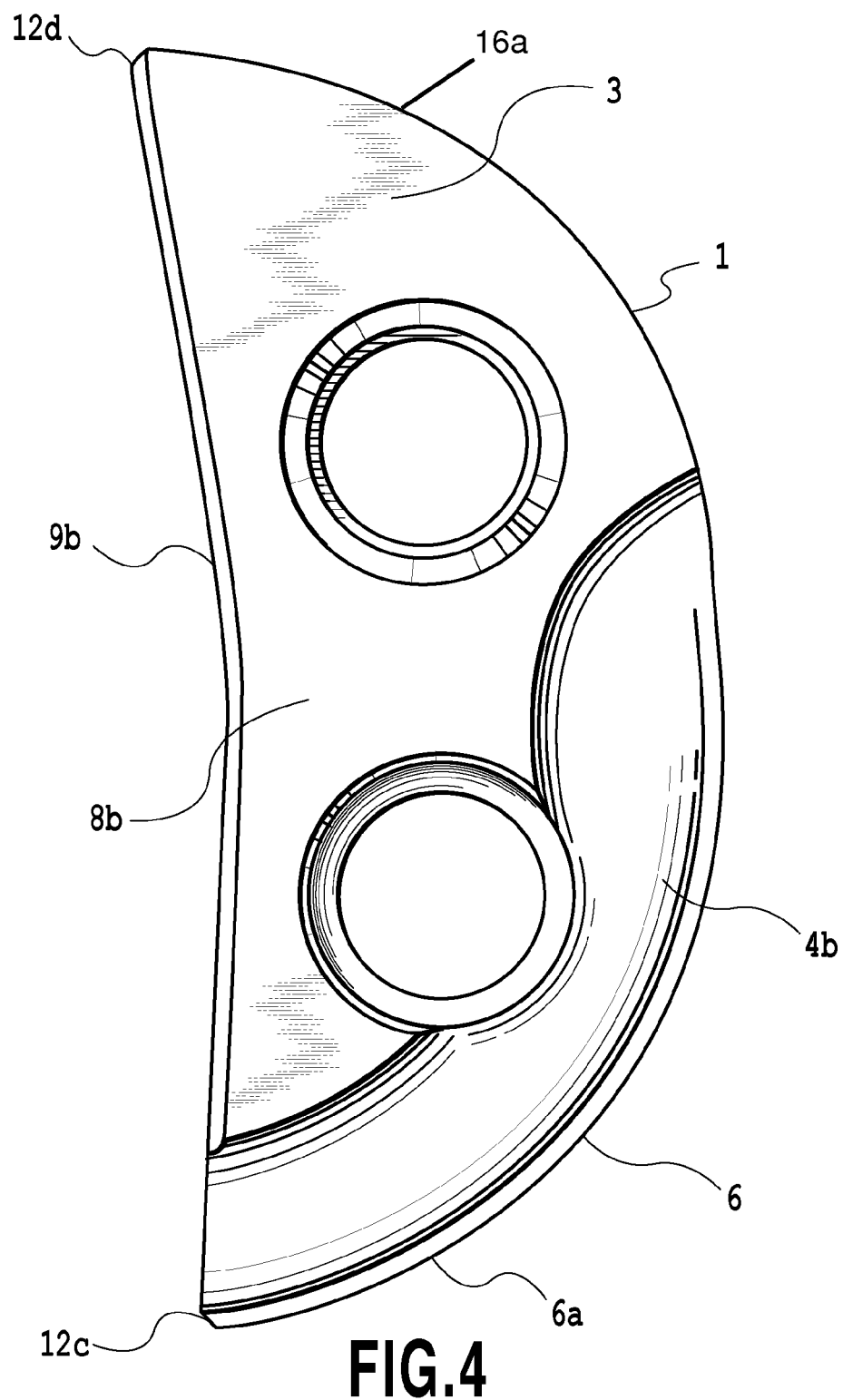
FIG. 4 is a bottom view of the cutting insert in FIG. 2.
Figure 5:
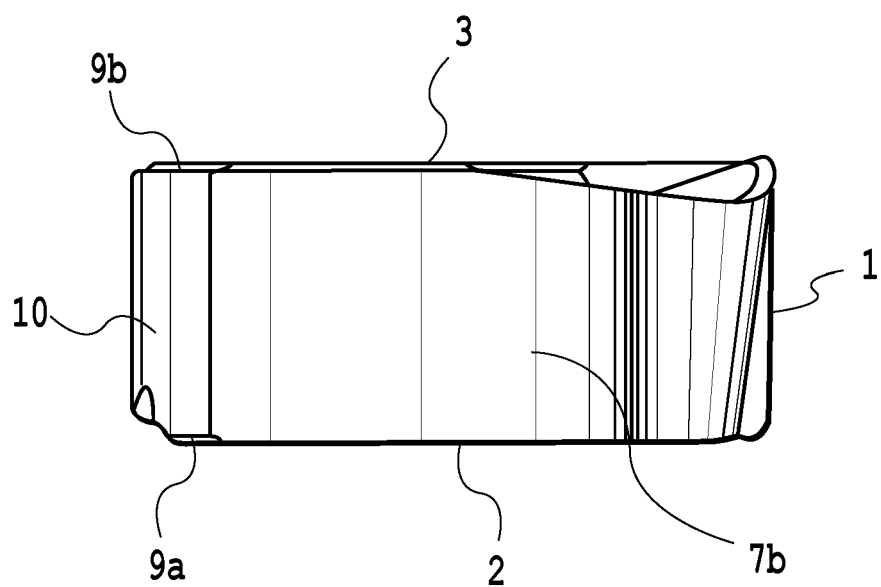
FIG. 5 is a rear view of the cutting insert in FIG. 2.

However, the connection portions need not be provided. If the connection portions are not provided, the cutting edge shape as seen from the upper or lower surface as shown in FIG. 2 or 4 can be made more similar to a circular arc. This facilitates inspection of the cutting edges for form accuracy during manufacturing steps.

The cutting tool according to the present embodiment is a 2-flute cutting edge-replaceable ball endmill having a tool diameter of φ=30.00 mm. In the cutting tool, the two cutting inserts 1 are simultaneously used. The cutting inserts 1 are installed respectively on a first insert seat 21a arranged so as to allow the first cutting edge portion 5a to serve as the cutting edge 5 and on a second insert seat 21b arranged so as to allow the second cutting edge portion 6a to serve as the cutting edge 6.

The rotational trajectory of the head portion (ball nose portion) is shaped like a sphere of about R=15.00 mm. As described above, the profile of each cutting insert 1 is similar to an ellipse and has a radius of curvature of about R=15.9 mm. Since the cutting inserts 1 with this profile are attached to the tool main body 20 in an inclined manner, the rotational trajectory of the head portion is shaped like a sphere of about R=15.00 mm. Two-flute cutting edge-replaceable ball endmills commonly used have a radius of curvature of at least about R=10.00 mm and at most about R=25.00 mm. The cutting tool according to the present embodiment is applicable to ball endmills of at least R=10.00 mm and at most R=25.00 mm and the like.

When the cutting insert 1 is installed in the tool main body 20 of the rotary cutting tool, top surfaces (boss surfaces) of the cutting insert 1, that is, the upper surface 2 and lower surface 3 except for the rake face 4, correspond to a second seating surface 8a of the upper surface 2 and a first seating surface 8b of the lower surface 3, respectively. The first seating surface 8b is formed adjacent to a first ridge portion 16a of the lower surface 3 which lies opposite the first cutting edge portion 5a. Furthermore, the second seating surface 8a is formed adjacent to a second ridge portion 15a of the upper surface 2 which lies opposite the second cutting edge portion 6a. When the first seating surface 8b and the second seating surface 8a are thus formed, a cutting force exerted on the cutting edge portions 5a and 6a can be borne at more outward positions by the seating surfaces 8a and 8b, corresponding to the respective back surfaces. Thus, the cutting insert 1 is restrained from moving and can be more appropriately seated on the tool main body 20.

Furthermore, the first ridge portion 16a of the lower surface 3 adjacent the first seating surface 8b, and the second ridge portion 15a of the upper surface adjacent the second seating surface 8a, are not used as cutting edges. This reduces the probability of damaging, during the first use, the second seating surface 8a, located on the same side on which the cutting edge 5 sits, and the first seating surface 8b, located on the same surface on which the cutting edge 6 sits, while preventing the cutting insert 1 from being inappropriately seated during the second use when the cutting insert 1 is turned upside down. When the cutting insert 1 is appropriately seated as described above, the cutting insert 1 is restrained from moving during machining, thus improving the tool stiffness of the cutting tool. The thus improved tool stiffness is advantageously effective in, for example, carrying out high feed machining for increased efficiency.

In the present embodiment, the seating surfaces 8a and 8b are flat planes parallel to the upper surface 2 and the lower surface 3. However, the seating surfaces 8a and 8b are not limited to this shape. Any shape may be used provided that the shape allows the seating surfaces 8a and 8b to abut on the insert seat of the cutting tool. For example, the seating surfaces 8a and 8b may be curved so as to fit the insert seat surface of the cutting tool. Furthermore, the seating surfaces 8a and 8b may be inclined on the upper surface 2 and the lower surface 3.

A part of the flank face 7 which corresponds to the second cutting edge portion 6a includes an inclined portion extending from the upper surface 2 toward the opposite lower surface 3 and inclining toward the inside of the cutting insert 1 as the inclined portion leaves the second cutting edge portion 6a. That is, the part of the flank face 7 which corresponds to the second cutting edge portion 6a forms a second flank face portion 7b with a positive clearance angle. Furthermore, a part of the flank face 7 which corresponds to the first cutting edge portion 5a includes a surface perpendicular to the upper surface 2 and the lower surface 3. That is, in view of the single cutting insert 1, the part of the flank face 7 which corresponds to the first cutting edge portion 5a includes a first flank face portion 7a with a clearance angle of 0°. Namely, this part of the flank face is what is called a negative flank face. The clearance angles and the flank face can also be described as follows. When a virtual central plane P1 passing midway between the upper surface 2 and the lower surface 3 is assumed to be a first virtual plane (see FIG. 6), the flank face 7 includes a first flank face portion 7a orthogonal to the first virtual plane and a second flank face portion 7b crossing the first virtual plane at an acute angle or an obtuse angle. In the present embodiment, the virtual central plane P1 between the upper surface 2 and the lower surface 3 is parallel to the upper surface 2 and the lower surface 3 and substantially divides the cutting insert 1 into two parts of the same volume.

In the present embodiment, a part of the flank face 7 which corresponds to the second cutting edge portion 6a is formed to include the second flank face portion 7b with a positive clearance angle. The part of the flank face 7 which corresponds to the first cutting edge portion 5a is formed to include the first flank face portion 7a with a clearance angle of 0°. However, the present invention is not limited to this configuration. That is, in contrast, the part of the flank face 7 which corresponds to the second cutting edge portion 6a may be formed to have a clearance angle of 0°, whereas the part of the flank face 7 which corresponds to the first cutting edge portion 5a may be formed to have a positive clearance angle. Alternatively, both parts of the flank face 7 may have a clearance angle of 0° or a positive clearance angle. The strength of the cutting insert 1 can advantageously be increased by setting the flank face 7 of the cutting edge with a central edge to have a clearance angle of 0° and forming the flank face 7 of the cutting edge with no central edge to have a positive clearance angle. This is because the heaviest load during machining is imposed on the cutting edge close to the rotation center.

Substantially V-shaped edge lines 9a and 9b (see FIG. 2 and FIG. 4) are not cutting edges. Thus, a part of the side surface 13 which corresponds to the substantially V-shaped edge lines 9a and 9b is not a flank face 7. The part of the side surface 13 which corresponds to the substantially V-shaped edge lines 9a and 9b is hereinafter referred to as a side surface abutting surface 10. When the cutting inserts 1 are installed in the tool main body 20 of the rotary cutting tool, the side surface abutting surface 10 is brought into abutting contact with a wall surface located upright from the seat surface of the insert seat. The side surface abutting surface 10 thus acts as a part of the seating surface. The side surface seating surface is substantially V-shaped. Hence, when the cutting inserts 1 are installed in the tool main body 20 of the rotary cutting tool, movement of the cutting inserts 1 is restrained. This allows the cutting inserts 1 to be positioned and firmly fixed. As a result, the tool main body 20 of the rotary cutting tool and the rotary cutting tool itself offer an improved tool stiffness.

In the present embodiment, the side surface abutting surface 10 is formed to be perpendicular to the upper surface 2 and the lower surface 3. That is, the side surface abutting surface 10 is what is called a negative side surface. The negative side surface generally refers to a side surface with a clearance angle of 0° and is a term not often used except for the flank face. However, here, the side surface abutting surface is referred to as a negative side surface in order to assist the reader's understanding.

Figure 9:
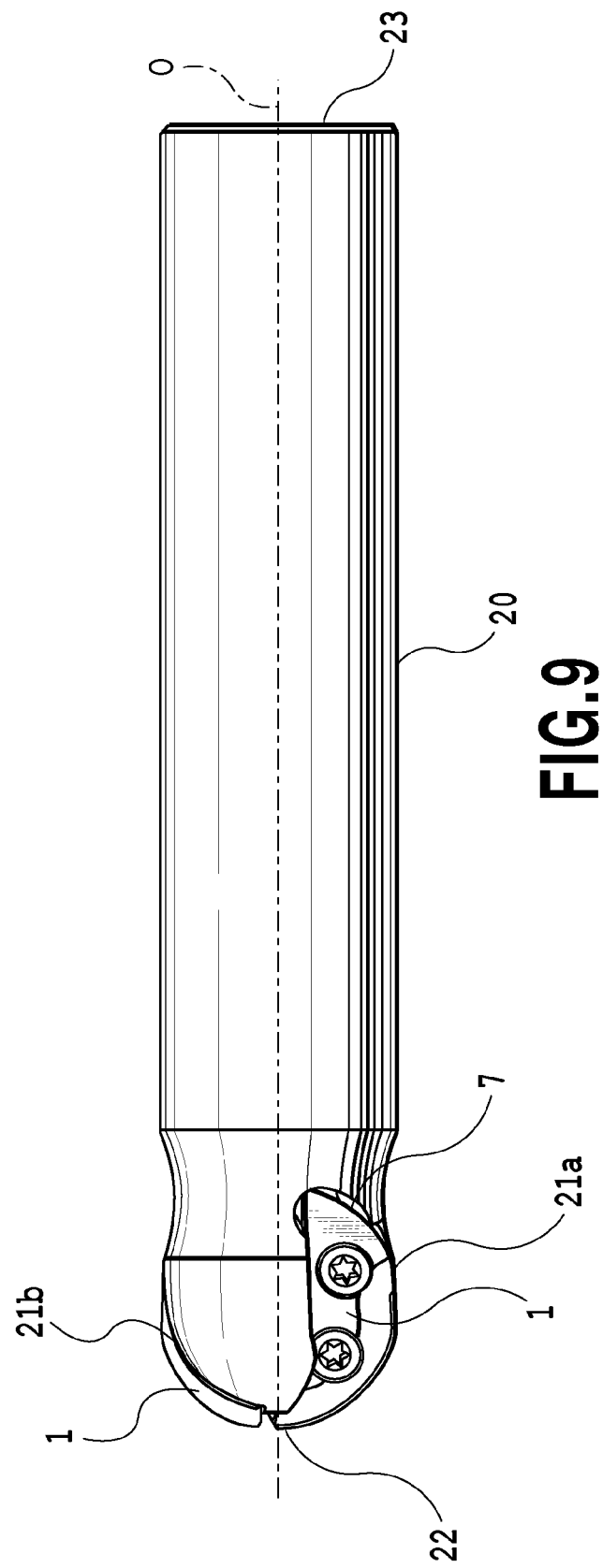
FIG. 9 is a front view of the rotary cutting tool in FIG. 8.
Figure 10:
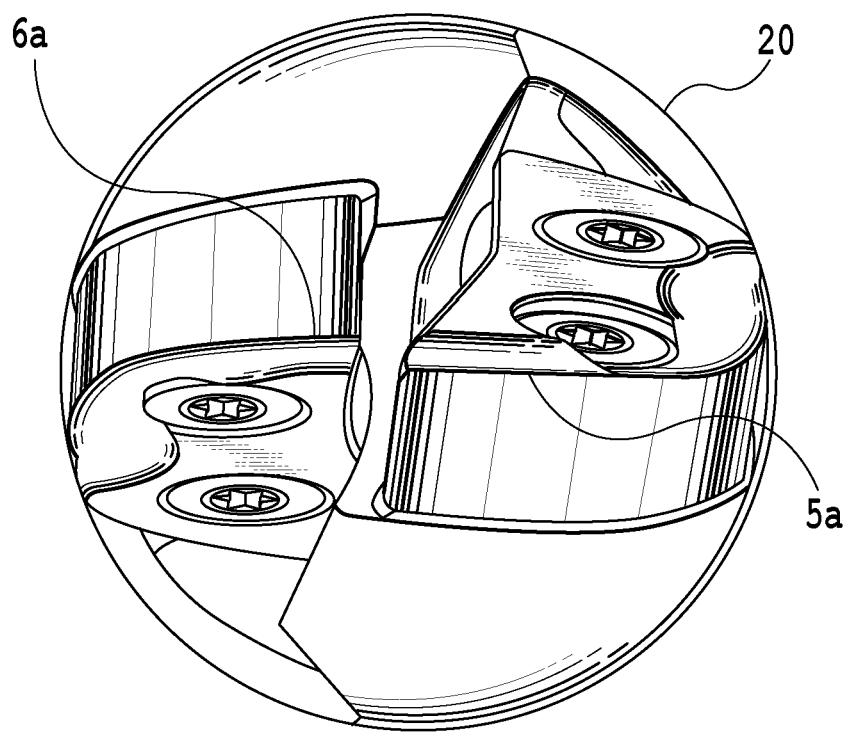
FIG. 10 is a bottom view of the rotary cutting tool in FIG. 8.

As shown in FIG. 9, a part of the flank face 7 also acts as an abutting surface when the cutting inserts 1 are installed in the tool main body 20 of the rotary cutting tool. This allows the cutting inserts 1 to be more firmly fixed so as not to move. Moreover, the tool is provided with an increased tool stiffness. In the present embodiment, a connection surface is provided so as to smoothly join the second flank face portion 7b with a positive clearance angle to the first flank face portion 7a with a clearance angle of 0°; the flank face portions 7a and 7b belonging to the flank face 7. Alternatively, the following configuration is possible: such a connection surface as described above is not provided, and the second flank face portion 7b with a positive clearance angle and the first flank face portion 7a with a clearance angle of 0° form a crossing edge line and are thus directly connected together.

As shown in FIG. 9, a part of the flank face of circular arc-shaped cutting edges in the side which is not operative is used as an abutting surface abutting on the insert seat. That is, in a neighborhood of circular arc-shaped cutting edges in the side which is not operative, there is a wall surface of the insert seat so that both sides of the cutting insert is sandwiched. By this, even if the cutting power of the rotatory direction is applied to the cutting insert, this cutting insert can be restrained so that the cutting insert cannot rotate in either direction. That is to say, the cutting insert does not move and is fixed strongly. Thus, the tool rigidity as a rotation cutting tool increases conjointly with the tool rigidity of the tool body 20 of the rotation cutting tool.

In the present embodiment, the first flank face portion 7a with a clearance angle of 0° is formed, and the side surface abutting surface 10 is formed as a negative side surface. This configuration is used in order to reduce the manufacturing costs of the cutting insert 1. That is, the configuration facilitates extraction of a formed cutting insert from a dies serving as a mold in a powder pressure forming step included in the manufacturing steps. When the number of negative parts of the side surface is increased and the flank face requiring a positive clearance angle are inclined in one direction as described above, the cutting insert 1 can be manufactured using a mold with a relatively simple structure and shape in a normal power pressure forming step.

Furthermore, a part of the flank face 7 also acts as a side surface seating surface as described above. Thus, the flank face 7 with different shapes such as a negative surface and a flank face with a positive clearance angle serves to effectively prevent erroneous attachment when the cutting inserts 1 are installed on the insert seats 21a and 21b, respectively.

A material for the periphery of the cutting edges 5 and 6 of the cutting insert 1 is preferably selected from a group including hard materials of cemented carbide, cermet, ceramic, and cubic boron nitride, the hard materials with a PVD or CVD coating film coated on the surface thereof, and diamond.

Mounting holes 11a and 11b are formed so as to penetrate the upper surface 2 and lower surface 3 of the cutting insert 1. Providing two mounting holes allows the cutting insert 1 to be removably installed in the tool main body 20 of the rotary cutting tool using two fastening screws 30. That is, compared to a single fastening screw 30, the two fastening screws 30 allow the cutting insert 1 to be fastened with a double fastening force. For example, when the cutting insert 1 is used in a ball endmill, the direction in which the cutting force acts varies constantly, and a force may act in a direction in which the fastening screws 30 are loosened. The cutting insert 1 according to the present embodiment can exert the strong fastening force and thus prevent the fastening screws 30 from being loosened. Thus, the cutting insert 1 is precluded from moving during cutting. This prevents possible abnormal damage to the cutting insert 1 and enables a stable, efficient cutting operation.

Since the cutting edge 5 is formed not only on the upper surface 2 but also on the lower surface 3 of the cutting insert 1 as described above, the cutting insert 1 needs to be able to be fastened from both sides by the fastening screws 30. Thus, countersink shapes corresponding to abutting portions to be brought into abutting contact with the fastening screws 30 are formed in both the upper surface 2 and the lower surface 3.

To facilitate manufacture of the cutting insert 1 to reduce manufacturing costs, the mounting holes 11a and 11b are desirably formed to have central axes parallel to a part of the side surface. However, the formation of the mounting holes 11a and 11b is not limited to this manner. The number of the mounting holes is also not limited to two.

In a first corner portion 12a defined by the first cutting edge portion 5a and the substantially V-shaped edge line 9a on the upper surface, the two ridges 5a and 9a cross each other at an acute angle. Similarly, in a second corner portion 12c defined by the second cutting edge portion 6a and the substantially V-shaped edge line 9b on the lower surface, the two ridges 6a and 9b cross each other at an acute angle. Similar acute-angle crossings are present in third and fourth corner portions 12b and 12d on the opposite surface which lie opposite the first and second corner portions 12a and 12c, respectively, in the thickness direction of the cutting insert 1.

Since the ridge corner portions 12a, 12b, 12c, and 12d are at acute angles, the thickness of wall surface of the first insert seat 21a for the central edge can be increased; the first insert seat 21 is placed at the tip 22 of the tool close to the tool rotation center when the cutting insert 1 is installed in the tool main body 20 of the rotary cutting tool. That is, although the thickness of the tip is inevitably maximally thin, the acute cutting insert 1 allows an increase in thickness toward a rear end along the acute cutting insert 1 in spite of the thin tip portion. Thus, the wall surface of the insert seat 21a can have a thickness sufficient to withstand the cutting force. This allows the cutting insert 1 to be adequately supported during machining (see FIG. 10). As described, in the present invention, the average thickness of wall surface of the insert seat 21a is sufficient to withstand a strong cutting force in spite of the thin tip portion. Similarly, the wall surface of the second insert seat 21b can have a sufficient thickness. As a result, the tool offers a high stiffness.

As described above, in the cutting insert 1 according to the present invention, both two vertices have acute angles. Thus, even if the two insert seats 21a and 21b are inevitably close to each other, the average thickness of the wall surfaces of both insert seats 21a and 21b allows the wall surfaces to sufficiently bear the cutting inserts 1 during machining. Furthermore, the second cutting edge portion (the cutting edge with no rotationally central edge) 6a and the first cutting edge portion (the cutting edge with a rotationally central edge) 5a can be attached to the tool main body 20 close to each other. Thus, almost no area is machined exclusively by the cutting edge with a rotationally central edge. This prevents an increased load from being imposed on the cutting edge with a rotationally central edge. Hence, the tool life of the cutting edge with no rotational central edge can be made substantially the same as that of the cutting edge with a rotationally central edge. Additionally, the level of the cutting conditions need not be reduced, and efficient cutting conditions can be maintained.

Once the wall surfaces of the insert seats 21a and 21b are provided with a sufficient thickness, the insert seats 21a and 21b need not be extended with the acute angle maintained. In the present embodiment, the insert seats 21a and 21b are formed into the substantially V-shaped edge lines 9a and 9b, and the corresponding side surface abutting surface 10 is "bent" (by virtue of the vertex of the "V" in the halfway thereof. Compared to a simple plane, the thus bent surface serving as the side surface abutting surface 10 limits movement of the cutting insert 1 and prevents a possible variation in the direction of the cutting force, thus improving stiffness. The bent surface is further combined with the use of two fastening screws 30 to allow a very high tool stiffness to be offered. Thus, the present embodiment can provide a rotary cutting tool (cutting edge-replaceable ball endmill) that enables an efficient cutting operation to be performed under hard cutting conditions.

A method for manufacturing a cutting insert according to the conventional art can be utilized as a method for manufacturing the cutting insert according to the present invention. That is, an interim product for the cutting insert is formed by powder pressure forming and sintering. The cutting insert is subjected to grinding such as honing as needed. Furthermore, the cutting insert is subjected to surface treatment such as CVD or PVD coating as needed. When the material of the cutting edge is a hard material such as cubic boron nitride, or diamond, the hard material or diamond is brazed to the raw material, which is then ground into a desired shape.

As described above, in the cutting insert 1 according to the present embodiment, the second flank face portion 7b with a positive clearance angle is inclined in one direction, whereas the other part of the side surface is formed not to incline, that is, formed as a negative side surface. Thus, during powder pressure forming, a formed cutting insert can be easily extracted from dies serving as a mold. This eliminates the need for a special powder pressure forming machine and allows the use of a mold with a relatively simple structure and shape. Consequently, a possible increase in manufacturing costs can be suppressed using known techniques. The shape of the formed cutting insert that can be easily extracted from the dies serving as a mold is not limited to the one according to the present embodiment. The shape is also not limited to one with a negative side surface perpendicular to the upper or lower surface. For example, for a cutting insert with mounting holes, a side surface parallel to the central axes of the mounting holes allows the formed cutting insert to be easily extracted from the dies serving as a mold. Furthermore, for the side surface except for the part parallel to the central axes of the mounting holes, the second flank face portion 7b may be inclined in one direction.

Furthermore, the cutting insert 1 requires no machining operation or the like for shaping the side surface 13. The side surface 13 can be shaped simply by powder pressure forming and sintering. Manufacturing the cutting insert 1 as described above enables manufacturing costs to be reduced using known techniques.

Known techniques can be utilized to form two mounting holes 11a and 11b in the cutting insert 1 according to the present invention. For example, two core rods (cores) are attached to a powder pressure forming machine, or one core rod includes two round bar-shaped cores corresponding to two hole shapes. The use of such a mold allows the cutting insert 1 to be manufactured in the same manner as that of a conventional method for manufacturing a cutting insert.

Furthermore, the tool main body 20 of the cutting tool used in the present invention can be manufactured by the conventional method for manufacturing such tool bodies. Insert seats may be formed at desired positions of the tool main body 20. For a cutting edge-replaceable ball endmill, a clearance may be provided for the tool so as to ensure the appropriate flank face based on the desired cutting edge shape.

Now, the results of experiments on the embodiment of the present invention will be described. As a typical example, machining of circular arc grooves in carbon steel S55c will be described. An experimental tool was a 2-flute cutting edge-replaceable ball endmill with two cutting inserts 1 according to the present embodiment. The diameter of the tool was $\phi=30.00$ mm. Conventional tools to be compared with the above-described ball endmill wee 2-flute cutting edge-replaceable ball endmills according to the disclosed two patent literatures. One tool was provided for each of these types, and a total of two types of tools were prepared. The depth of each groove machined is 0.3 times as large as the tool diameter, that is, 9 mm. The machining was achieved during one cutting operation as to the depth of cut; the cutting operation was not divided into steps. The maximum cutting width was about 27.51 mm. The cutting speed was about 200 m/min at an outer peripheral portion.

For conventional cutting tools, even those which allow a feed rate to be maximally increased are limited to about 700 mm/min in terms of table feeding. The cutting insert was damaged as soon as the feed rate exceeds the limit value and the cutting insert was not able to continue cutting. In contrast, even with the table feed rate increased up to about 1,000 mm/min, the cutting edge-replaceable ball endmill according to the present invention was successfully continuously used without causing abnormal damage to the cutting inserts 1. Thus, the cutting edge-replaceable ball endmill enabled the table feed rate to be increased by about 50% compared to the conventional tools.

The cutting tool according to the present invention is removably installed in a machine tool, for example, a machining center. The cutting tool then cuts a material to be cut such as a steel material by being rotationally moved around a tool rotation axis O and also being moved relative to a table with the material placed thereon. The cutting insert 1 according to the present invention can also be used for a machine tool such as a lathe. However, the characteristics of the cutting insert 1 according to the present invention are advantageous once the cutting insert 1 is installed in a rotary cutting tool, which is then installed in a machine tool such as a machining center. In particular, the characteristics and effects of the cutting insert 1 according to the present invention are significant when the cutting insert 1 is used as a cutting edge-replaceable ball endmill.

The present invention is not limited to the above-described embodiment. Of course, the configuration of the present invention may be subjected to appropriate changes, additions, and deletions without departing from the spirits of the present invention. For example, the present invention is not limited to the 2-flute rotary cutting tool and is applicable to a rotary cutting tool with at least three cutting edges.

As described above, the upper surface of the substantially crescent moon-shaped cutting insert includes the first rake face and the second seating surface. The lower surface of the substantially crescent moon-shaped cutting insert includes the second rake face and the first seating surface. The substantially crescent moon-shaped cutting insert further includes the substantially circular arc-shaped first cutting edge portion adjacent to the first rake face and the substantially circular arc-shaped second cutting edge portion adjacent to the second rake face. The two vertices of the substantially circular arc-shaped second cutting edge portion are each at an acute angle. Thus, a cutting insert and a cutting tool have been implemented which require only low manufacturing costs per cutting edge and which offer a very high tool stiffness, the cutting insert and cutting tool thus enabling efficient cutting.

Second Embodiment

Second embodiment of the present invention will be described below with reference to the drawings. The basic configuration of the present embodiment is similar to that of the above-described embodiment. Thus, only characteristic components will be described below.

Figure 16A:
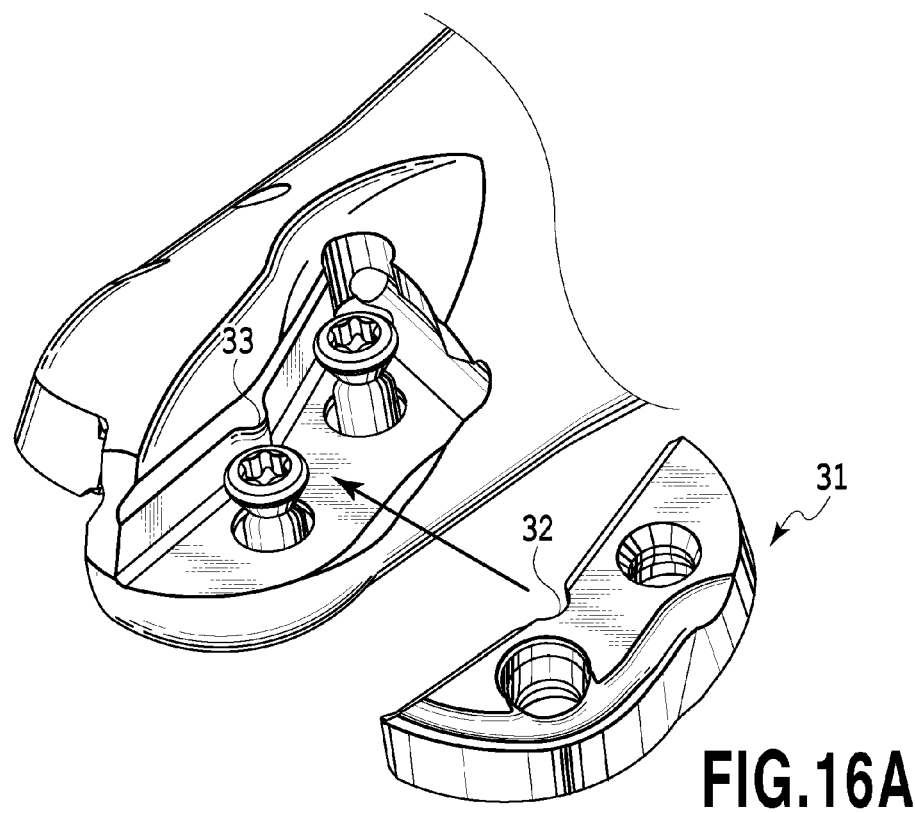
FIG. 16A is a perspective view showing a cutting insert according to the present embodiment and a rotary cutting tool to which the cutting insert is attached.
Figure 16B:
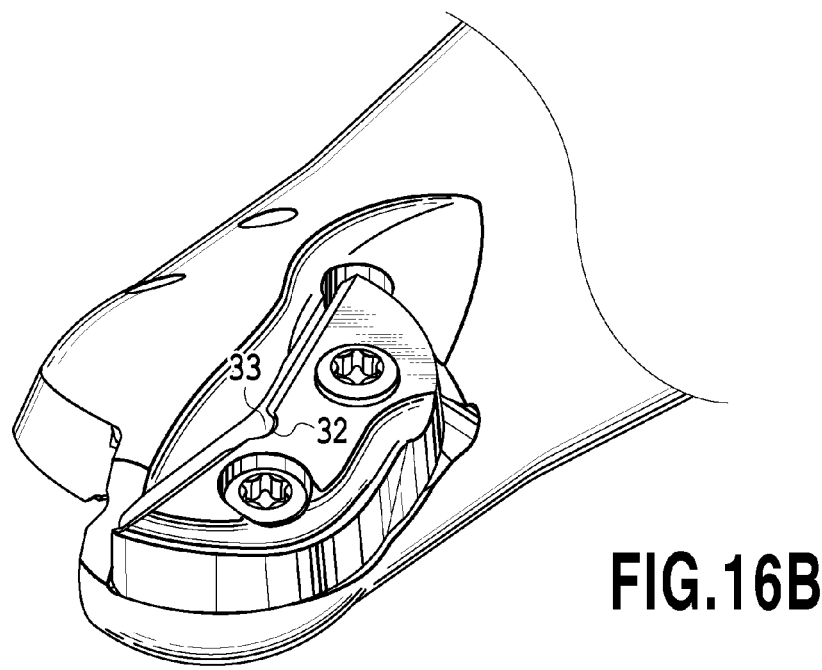
FIG. 16B is a perspective view showing a cutting insert according to the present embodiment and a rotary cutting tool to which the cutting insert is attached.

FIGS. 16A and 16B are each a perspective view showing a cutting insert according to the second embodiment and a rotary cutting tool with the cutting insert attached thereto. A cutting insert 31 according to the second embodiment includes an orienting cutout 32 formed in a part thereof. The rotary cutting tool that uses the cutting insert 32 includes an orienting projection 33 corresponding to the orienting cutout 32. The position of the orienting cutout 32 varies between a case where a front surface edge is used and a case where a back surface edge is used. The orienting cutout 32 allows the front surface edge and the back surface edge to be prevented from being erroneously installed in the rotary cutting tool. This allows the cutting insert to be efficiently used until the cutting insert comes to the end of its tool life without causing the front surface edge and the back surface edge to be erroneously installed.

The orienting cutout may be formed at any position provided that the position allows the front surface edge and the back surface edge to be prevented from being erroneously installed. Furthermore, a plurality of orienting cutouts may be formed.

Third Embodiment

Third embodiment of the present invention will be described below with reference to the drawings. The basic configuration of the present embodiment is similar to that of the above-described embodiment. Thus, only characteristic components will be described below.

Figure 17:
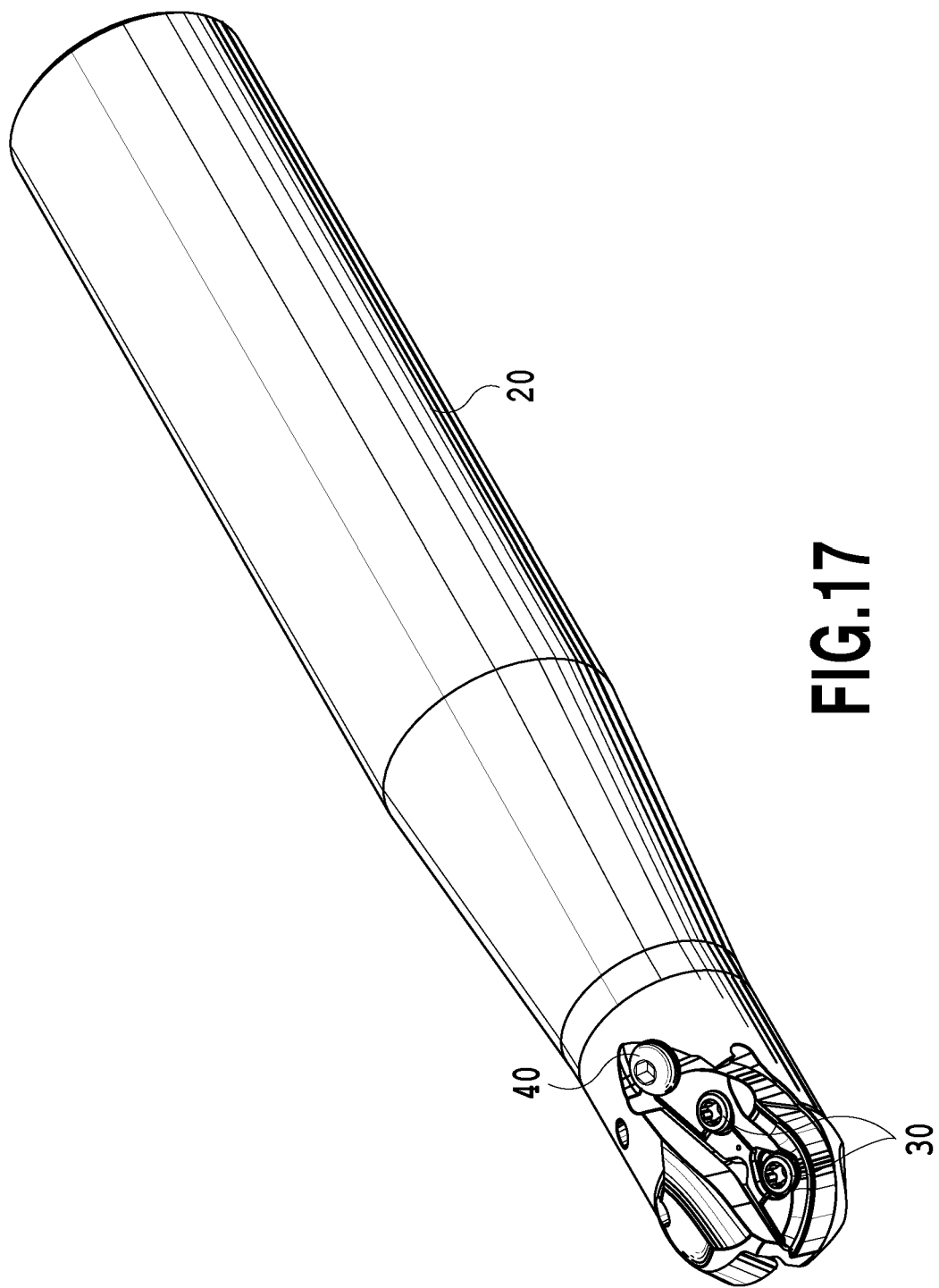
FIG. 17 is a perspective view showing a cutting insert according to the present embodiment and a rotary cutting tool with the cutting insert attached thereto.

FIG. 17 is a perspective view showing a cutting insert according to the second embodiment and a rotary cutting tool with the cutting insert attached thereto. The cutting insert can be attached to the cutting tool by two fastening screws 30, much as seen in the previous figures. In the embodiment of FIG. 17, the cutting insert is attached to the cutting tool by a press bolt 40 in addition to two fastening screws 30 in order to further improve the clamp rigidity of the cutting insert.

In the cutting tool seen in FIG. 17, a screw hole for the press bolt 40 is provided in the position where the screw hole does not overlap with the cutting insert. By fixing and tightening up the press bolt 40 attached to the screw hole, the cutting insert is sandwiched and fastened by a press bolt head of the press bolt 40. Thus, by fastening the cutting insert, the cutting insert can be prevented from floating up from the cutting tool during cutting, and stability of the cutting insert under cutting can be raised.

Figure 18:
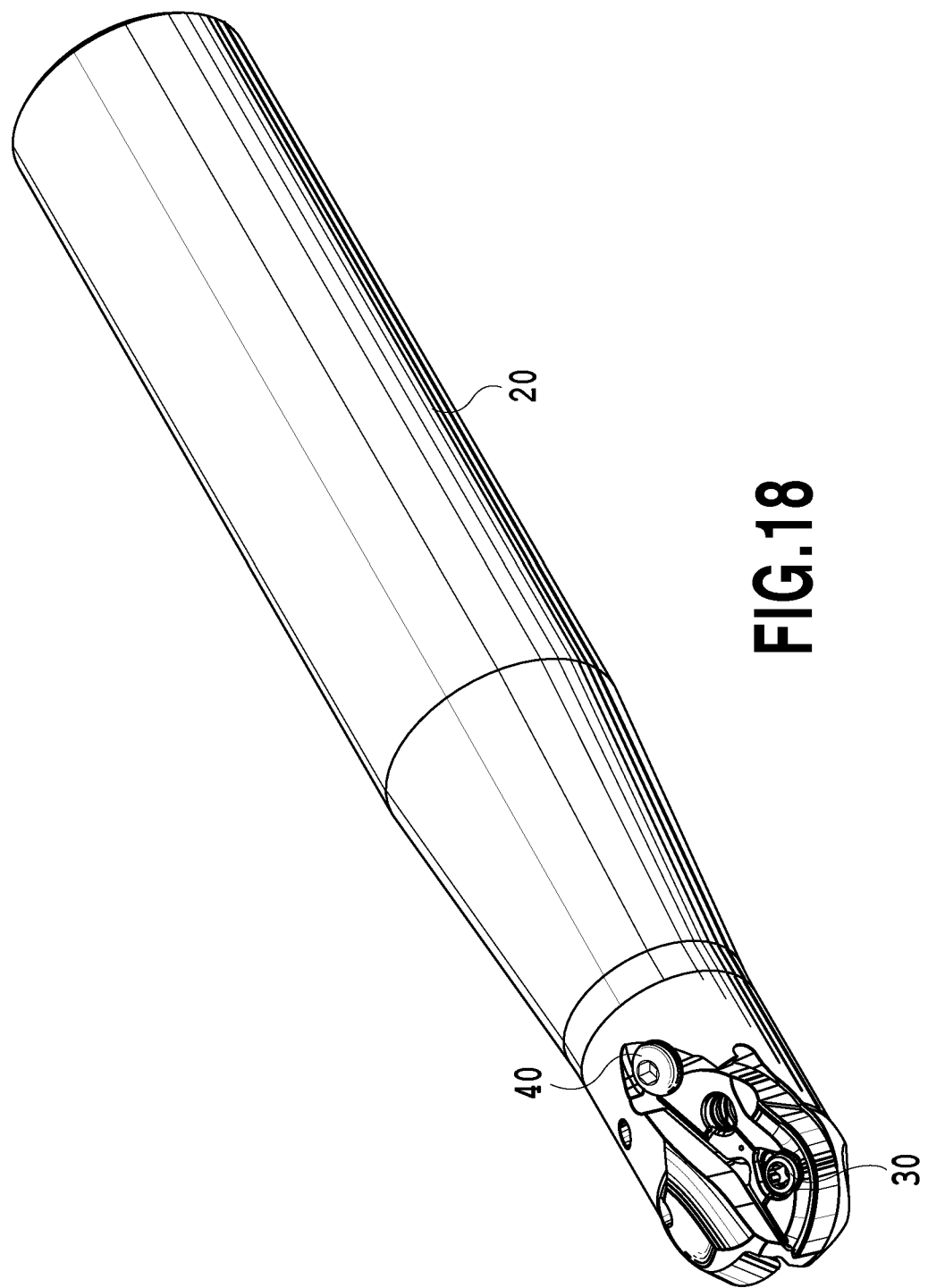
FIG. 18 is a perspective views showing a cutting insert according to the present embodiment and a rotary cutting tool with the cutting insert attached thereto.
Figure 19:
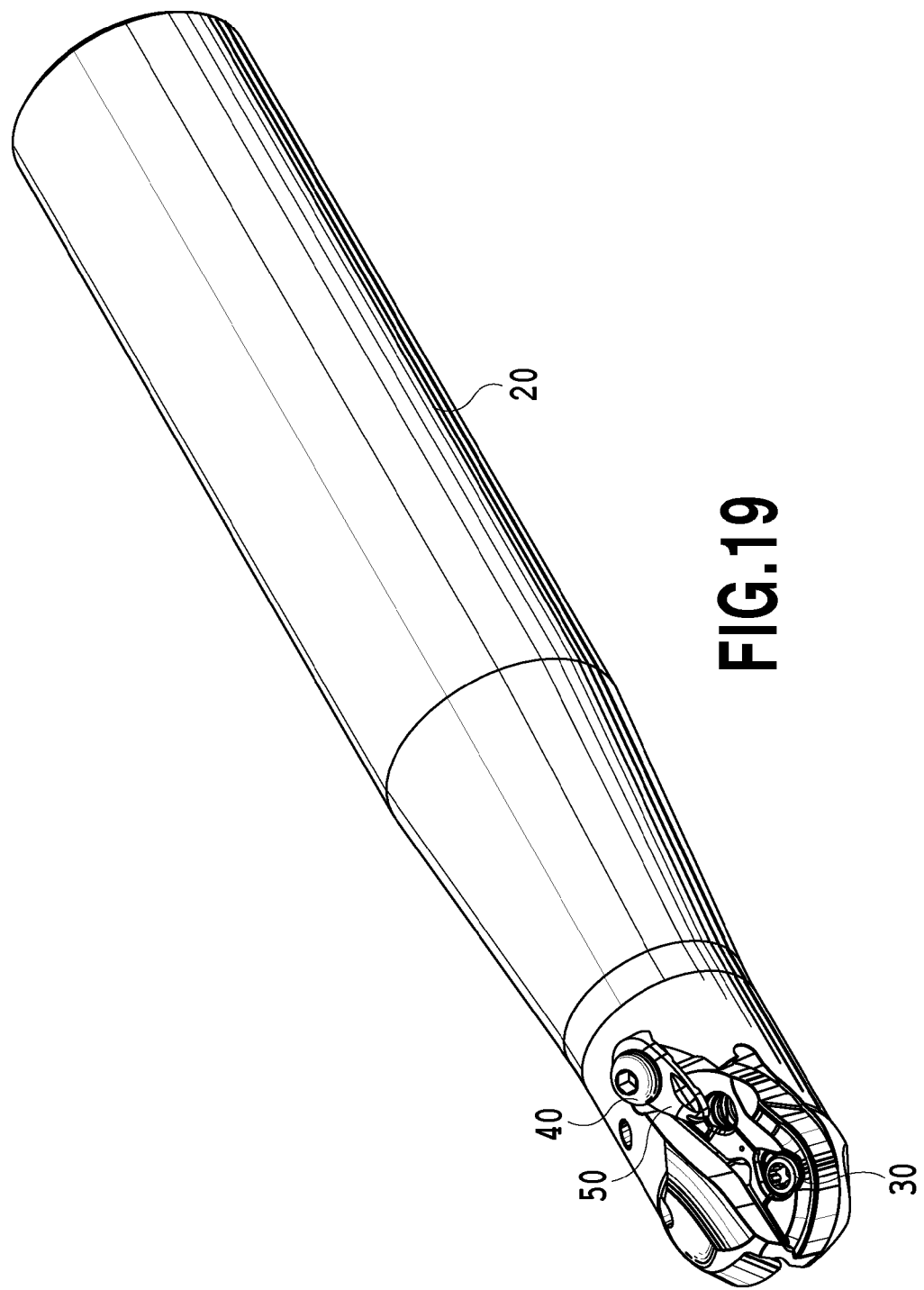
FIG. 19 is a perspective views showing a cutting insert according to the present embodiment and a rotary cutting tool with the cutting insert attached thereto.

FIG. 18 and FIG. 19 are perspective views showing a cutting insert according to the second embodiment and a rotary cutting tool with the cutting insert attached thereto. When fixing the cutting insert with the press bolt 40 as in the embodiment of FIGS. 18 and 19, only one of the fastening screws 30 at a distal-end side is used to fix the cutting insert (see FIG. 18). In this case, the cutting insert is brought near to the side wall of an insert seat with the fastening screw at the distal-end side, and the press bolt 40 prevents the rear of the cutting insert from floating because of cutting power.

In the embodiment of FIG. 18, the cutting insert is fixed using the press bolt 40. However the cutting insert may be fixed by using a press piece 50 as shown in the embodiment of FIG. 19. The flexibility of the place at which the cutting insert is fixed can be raised by fixing the cutting insert with the press piece 50. In addition, neither the press bolt 40 nor the press piece 50 is limited to the present embodiment, but known technology can be applied.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST

1 Cutting insert
2 Upper surface
3 Lower surface
4 Rake face
4*a* First rake face
4*b* Second rake face
5 Cutting edge
5*a* substantially circular arc-shaped first cutting edge portion
6 Cutting edge
6*a* Second substantially circular arc-shaped second cutting edge portion
7 Flank face
7*a* Flank face portion with clearance of 0°
7*b* Flank face portion with positive clearance
8*a* Second seating surface
8*b* First seating surface
10 Abutting surface
11*a*, 11*b* Mounting holes
12*a*, 12*b*, 12*c*, 12*d* Acute vertices
13 Side surface
15*a* ridge portion of upper surface
16*a* ridge portion of lower surface
20 Tool main body
21*a* First insert seat
21*b* Second insert seat
30 Fastening screw O Tool rotation axis
P1 Virtual central plane passing midway between upper and lower surfaces

What is claimed is:

1. A cutting insert formed like a plate and comprising a seating surface and a cutting edge formed thereon, the seating surface formed like a plate and serving as an abutting surface when the cutting insert is attached to a tool main body, the cutting edge being formed at a crossing edge line portion between a rake face and a flank face provided on a side surface of the plate,
    wherein the plate includes an upper surface with a first rake face and a second seating surface formed thereon and a lower surface with a second rake face and a first seating surface formed thereon,
    the cutting edge comprises a substantially circular-arc-shaped first cutting edge portion formed at a crossing edge line portion between the first rake face formed on the upper surface of the plate and a first flank face portion formed on the side surface of the plate, and a substantially circular-arc-shaped second cutting edge portion formed at a crossing edge line portion between the second rake face formed on the lower surface of the plate and a second flank face portion formed on the side surface of the plate,
    between the upper surface and lower surface of the plate, the substantially circular-arc-shaped first cutting edge portion and a crossing edge line portion between the first seating surface and the first flank face portion are positioned opposite each other, and
    between the upper surface and lower surface of the plate, the substantially circular-arc-shaped second cutting edge portion and a crossing edge line portion between the second seating surface and the second flank face portion are positioned opposite each other.

2. The cutting insert according to claim 1, wherein the substantially circular-arc-shaped first cutting edge portion and the substantially circular-arc-shaped second cutting edge portion have different lengths.

3. The cutting insert according to claim 1, wherein the cutting insert has a substantial crescent shape, and two vertices of the substantial crescent shape each form an acute angle.

4. The cutting insert according to claim 1, comprising at least two attaching holes penetrating the upper and lower surfaces of the plate.

5. The cutting insert according to claim 1, wherein:
    a virtual central plane (P1) passing midway between the upper surface and the lower surface is referred to as a first virtual plane, and
    the first flank face portion is orthogonal to the first virtual plane, and
    the second flank face portion crosses the first virtual plane at an acute angle or an obtuse angle.

6. A rotary cutting tool on which at least one cutting insert according to claim 1 is removably installed.

7. The rotary cutting tool according to claim 6, comprising a screw hole for fixing a press bolt to retain the at least one cutting insert.

8. The rotary cutting tool according to claim 6, wherein the rotary cutting tool is a ball end mill.

9. The rotary cutting tool according to claim 8, wherein:
    two attaching holes penetrate the upper and lower surfaces of the plate; and
    the first flank face portion is parallel to a central axis of at least one of the attaching holes penetrating the upper and lower surfaces of the plate.

10. The rotary cutting tool according to claim 8, wherein:
    two cutting inserts are removably installed in the ball end mill;
    on each of the two cutting inserts, the substantially circular-arc-shaped first cutting edge portion and the substantially circular-arc-shaped second cutting edge portion have different lengths
    a first of the two cutting inserts is mounted such that the substantially circular-arc-shaped first cutting edge portion is operative; and
    a second of the two cutting inserts is mounted such that the substantially circular-arc-shaped second cutting edge portion is operative.

11. A plate-like cutting insert comprising:
    an upper surface and a lower surface facing in opposite directions;
    a side surface connecting the upper and lower surfaces, the side surface comprising a flank face and an abutting surface; wherein:
    the upper surface has first rake face and a second seating surface formed thereon;
    the lower surface has with a second rake face and a first seating surface formed thereon,
    a substantially circular-arc-shaped first cutting edge portion is formed at a crossing edge line portion between the first rake face formed on the upper surface and a first flank face portion formed on the side surface;
    a substantially circular-arc-shaped second cutting edge portion is formed at a crossing edge line portion between the second rake face formed on the lower surface and a second flank face portion formed on the side surface;
    between the upper surface and lower surface of the plate, the first cutting edge portion and a crossing edge line portion between the first seating surface and the first flank face portion are positioned opposite each other, and
    between the upper surface and lower surface of the plate, the second cutting edge portion and a crossing edge line portion between the second seating surface and the second flank face portion are positioned opposite each other.

12. The plate-like cutting insert according to claim 11, wherein the cutting insert has a substantial crescent shape, and two vertices of the substantial crescent shape each form an acute angle.

13. The plate-like cutting insert according to claim 11, wherein the substantially circular-arc-shaped first cutting edge portion and the substantially circular-arc-shaped second cutting edge portion have different lengths.

14. The plate-like cutting insert according to claim 11, comprising at least two attaching holes penetrating the upper and lower surfaces.

15. The plate-like cutting insert according to claim 11, wherein:
    a virtual central plane (P1) passing midway between the upper surface and the lower surface is referred to as a first virtual plane, and
    the first flank face portion is orthogonal to the first virtual plane, and
    the second flank face portion crosses the first virtual plane at an acute angle or an obtuse angle.

16. The plate-like cutting insert according to claim 11, wherein:
    the abutting surface of the cutting insert's side surface is provided with an orienting cutout configured to prevent improper seating of the cutting insert.

17. A ball endmill comprising two plate-like cutting inserts in accordance with claim 11 removably installed therein, wherein:
- on each of the two plate-like cutting inserts, the substantially circular-arc-shaped first cutting edge portion and the substantially circular-arc-shaped second cutting edge portion have different lengths
- a first of the two plate-like cutting inserts is mounted such that the substantially circular-arc-shaped first cutting edge portion is operative; and
- a second of the two plate-like cutting inserts is mounted such that the substantially circular-arc-shaped second cutting edge portion is operative.

18. The ball endmill according to claim 17, wherein:
- the abutting surface of each cutting insert's side surface is provided with an orienting cutout configured to prevent improper seating of the cutting insert;
- the ball endmill comprises orienting projections corresponding to the orienting cutouts formed on the cutting inserts' abutting side surfaces.

19. The ball endmill according to claim 17, comprising a screw hole for each cutting insert for fixing a press bolt to retain said each cutting insert.

\* \* \* \* \*